(12) United States Patent
Kuehne et al.

(10) Patent No.: US 11,813,729 B2
(45) Date of Patent: Nov. 14, 2023

(54) POWER TOOL WITH PARTITION ASSEMBLY BETWEEN TRANSMISSION AND MOTOR

(71) Applicant: Black & Decker Inc., New Britain, CT (US)

(72) Inventors: Brent Austin Kuehne, Red Lion, PA (US); Gao Jian, Jiangsu (CN); Wang Guoqing, Jiangsu (CN); Zhang Yukun, Jiangsu (CN); Chen Jianhua, Jiangsu (CN); Zhu Wen, Jiangsu (CN); Wu Yanmin, Jiangsu (CN); Lu Xiaoli, Jiangsu (CN); Colin Crosby, White Marsh, MD (US); Lynn Weikel, Baltimore, MD (US); Tong Zheng, Jiangsu (CN); Xiaolie Niu, Suzhou (CN)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/130,497

(22) Filed: Dec. 22, 2020

(65) Prior Publication Data

US 2021/0107131 A1    Apr. 15, 2021

Related U.S. Application Data

(63) Continuation-in-part of application No. 15/978,258, filed on May 14, 2018, now Pat. No. 10,971,966.

(51) Int. Cl.
*H02K 5/10* (2006.01)
*H02K 7/116* (2006.01)
(Continued)

(52) U.S. Cl.
CPC ............... *B25F 5/02* (2013.01); *F16J 15/447* (2013.01); *H02K 5/10* (2013.01); *H02K 7/145* (2013.01); *H02K 5/124* (2013.01)

(58) Field of Classification Search
CPC . H02K 5/10; F16C 33/80; B25F 5/001; B25F 5/02; B25F 5/008; F16J 15/447
See application file for complete search history.

(56) References Cited

U.S. PATENT DOCUMENTS 2,055,337 A    9/1936  Coates
2,227,922 A    1/1941  William
(Continued)

FOREIGN PATENT DOCUMENTS

CN    2761885 Y    3/2006
CN    201805298 U    4/2011
(Continued)

OTHER PUBLICATIONS

European Search Report for EP Application No. EP 21 15 2401 dated Jun. 22, 2021, 7 pages.
(Continued)

*Primary Examiner* — Burton S Mullins
(74) *Attorney, Agent, or Firm* — Scott B. Markow

(57) ABSTRACT

A power tool includes a tool housing and a motor assembly received in the tool housing. The motor assembly has a rear end portion, a front end portion, and a motor output shaft. A transmission housing is coupled to the motor housing with a transmission received in the transmission housing, to which the motor output shaft is drivingly coupled. A partition assembly includes a rear cover covering a rear end portion of the transmission housing that faces the front end portion of the motor and a seal. The rear cover of the transmission housing, the front end portion of the motor, and the seal together define at least a first labyrinth path and a
(Continued)

second labyrinth path therebetween configured to inhibit grease or dust migration between the transmission housing and the motor assembly.

20 Claims, 31 Drawing Sheets

(51) Int. Cl.
*H02K 5/124* (2006.01)
*H02K 7/14* (2006.01)
*B25F 5/02* (2006.01)
*F16J 15/447* (2006.01)

(56) References Cited

U.S. PATENT DOCUMENTS

| | | | |
|---|---|---|---|
| 2,473,513 A | 6/1949 | Dewey | |
| 2,740,647 A | 4/1956 | Pelt | |
| 3,667,310 A | 6/1972 | Hahner | |
| 3,724,237 A | 4/1973 | Wood | |
| 3,817,115 A | 6/1974 | Schnizler et al. | |
| 3,818,255 A | 6/1974 | Wagner | |
| 4,082,475 A | 4/1978 | Kuder | |
| 4,335,886 A | 6/1982 | Frey et al. | |
| 4,364,286 A | 12/1982 | Ciolli | |
| 4,583,420 A | 4/1986 | Miley | |
| 5,217,137 A | 6/1993 | Andrews | |
| 5,290,047 A * | 3/1994 | Duffee | F16J 15/4474 277/419 |
| 5,320,177 A | 6/1994 | Shibata et al. | |
| 5,383,549 A | 1/1995 | Mayer | |
| 5,425,666 A | 6/1995 | Frank | |
| 5,624,000 A | 4/1997 | Miller | |
| 5,836,219 A | 11/1998 | Klingler et al. | |
| 5,897,454 A | 4/1999 | Cannaliato | |
| 6,226,877 B1 * | 5/2001 | Ono | B23D 49/162 30/392 |
| 6,247,702 B1 * | 6/2001 | Long | F16J 15/447 277/421 |
| 6,277,013 B1 * | 8/2001 | Sasaki | B24B 23/02 451/344 |
| 6,431,289 B1 | 8/2002 | Potter et al. | |
| 6,581,939 B1 | 1/2003 | Theros et al. | |
| 6,672,402 B2 | 1/2004 | Ortt et al. | |
| 6,676,557 B2 | 1/2004 | Milbourne et al. | |
| 6,805,207 B2 | 10/2004 | Hagan et al. | |
| 6,857,983 B2 | 2/2005 | Milbourne et al. | |
| 6,983,810 B2 | 1/2006 | Hara et al. | |
| 6,984,188 B2 | 1/2006 | Potter et al. | |
| 7,121,361 B2 | 10/2006 | Hara et al. | |
| 7,220,211 B2 | 5/2007 | Potter et al. | |
| 7,223,195 B2 | 5/2007 | Milbourne et al. | |
| 7,252,581 B2 | 8/2007 | Numata et al. | |
| 7,308,948 B2 | 12/2007 | Furuta | |
| 7,334,646 B2 | 2/2008 | Hara et al. | |
| 7,380,612 B2 | 6/2008 | Furuta | |
| 7,380,613 B2 | 6/2008 | Furuta | |
| 7,404,781 B2 | 7/2008 | Milbourne et al. | |
| 7,410,441 B2 | 8/2008 | Milbourne et al. | |
| 7,445,213 B1 | 11/2008 | Pelfrey | |
| 7,492,071 B2 | 2/2009 | Chaohai et al. | |
| 7,537,064 B2 | 5/2009 | Milbourne et al. | |
| 7,537,065 B2 | 5/2009 | Gallagher et al. | |
| 7,557,534 B2 | 7/2009 | Uehlein-Proctor et al. | |
| 7,722,444 B2 | 5/2010 | Gallagher | |
| 7,781,926 B2 | 8/2010 | Schmidt et al. | |
| 7,798,245 B2 | 9/2010 | Trautner | |
| 7,811,004 B2 * | 10/2010 | Dorner | B25F 5/02 384/488 |
| 7,900,714 B2 | 3/2011 | Milbourne et al. | |
| 7,932,695 B2 | 4/2011 | Uehlein-Proctor et al. | |
| 7,942,299 B2 | 5/2011 | Steinbrunner et al. | |
| 7,980,324 B2 | 7/2011 | Bixler | |
| 8,142,326 B2 | 3/2012 | Chen | |
| 8,196,728 B2 | 6/2012 | Gagnon | |
| 8,220,561 B2 | 7/2012 | Milbourne et al. | |
| 8,342,535 B2 | 1/2013 | Lattime et al. | |
| 8,397,342 B2 | 3/2013 | Baker et al. | |
| 8,418,779 B2 | 4/2013 | Leong et al. | |
| 8,485,275 B2 | 7/2013 | Kuroyanagi et al. | |
| 8,496,073 B2 | 7/2013 | Eisenhardt et al. | |
| 8,596,427 B2 | 12/2013 | Numata | |
| 8,760,102 B2 | 6/2014 | Hirabayashi | |
| 8,834,641 B2 | 9/2014 | Baker et al. | |
| 8,851,960 B2 | 10/2014 | Ikuta | |
| 8,905,891 B2 | 12/2014 | Roehm | |
| 8,936,107 B2 * | 1/2015 | Numata | B24B 23/028 173/217 |
| 8,961,358 B2 | 2/2015 | Hirabayashi | |
| 8,991,829 B2 | 3/2015 | Lattime et al. | |
| 9,011,009 B2 | 4/2015 | Trotter et al. | |
| 9,291,272 B2 | 3/2016 | Lattime et al. | |
| 9,528,608 B2 | 12/2016 | Elbacher et al. | |
| 9,844,869 B2 | 12/2017 | Ullrich | |
| 9,915,340 B2 | 3/2018 | Fuechsel et al. | |
| 2003/0034616 A1 | 2/2003 | Deforest et al. | |
| 2004/0175065 A1 * | 9/2004 | Nguyen | F16C 19/06 384/480 |
| 2005/0022358 A1 | 2/2005 | Hagan et al. | |
| 2005/0061524 A1 | 3/2005 | Hagan et al. | |
| 2008/0127407 A1 | 6/2008 | Wooten | |
| 2009/0207035 A1 | 8/2009 | Watanabe | |
| 2012/0292065 A1 | 11/2012 | Hoshi | |
| 2016/0061265 A1 | 3/2016 | Scholz et al. | |
| 2017/0005545 A1 | 1/2017 | Kaneko | |
| 2019/0168371 A1 | 6/2019 | Aoki | |
| 2019/0348887 A1 | 11/2019 | Kuehne et al. | |

FOREIGN PATENT DOCUMENTS

| | | |
|---|---|---|
| CN | 108397482 A | 8/2018 |
| CN | 209818303 U | 12/2019 |
| DE | 3004405 A1 | 8/1981 |
| DE | 10064684 B4 | 4/2005 |
| DE | 102008012752 A1 | 9/2009 |
| DE | 102010040212 A1 | 3/2012 |
| DE | 102014102709 A1 | 9/2015 |
| DE | 102016212127 A1 | 1/2018 |
| EP | 0525911 A2 | 2/1993 |
| EP | 1157791 A2 | 11/2001 |
| EP | 1327497 A2 | 7/2003 |
| EP | 1759813 A2 | 3/2007 |
| EP | 1593136 B1 | 8/2007 |
| EP | 2407278 A2 | 1/2012 |
| EP | 2431135 B1 | 10/2013 |
| EP | 2371492 B1 | 9/2017 |
| EP | 2996128 B1 | 1/2018 |
| EP | 3327741 A1 | 5/2018 |
| EP | 3338288 B1 | 10/2018 |
| EP | 3572191 A1 | 11/2019 |
| GB | 1191672 A | 5/1970 |
| GB | 2414049 A | 11/2005 |
| JP | S55152963 A | 11/1980 |
| JP | H03261360 A | 11/1991 |
| JP | 08182242 | 7/1996 |
| JP | 2004340210 A | 12/2004 |
| JP | 2008062342 | 3/2008 |
| JP | H10156759 A | 2/2010 |
| JP | 2011015479 A | 1/2011 |
| JP | 2011056621 A | 3/2011 |
| JP | 5748801 B2 | 5/2015 |
| JP | 2016165198 A | 9/2016 |
| WO | 2011099487 A1 | 8/2011 |

OTHER PUBLICATIONS

Coli, Enrico—Extended European Search Report—dated Oct. 28, 2019—9 pages—European Patent Office—Munich Germany.
English machine translation, Nakamura et al., JP2011056621. (Year: 2011).
Extended European Search Report dated Jun. 21, 2022, issued in application No. EP21152401.2.

(56) References Cited

OTHER PUBLICATIONS

U.S. Appl. No. 15/978,258, filed Mar. 14, 2018, Patented.

* cited by examiner

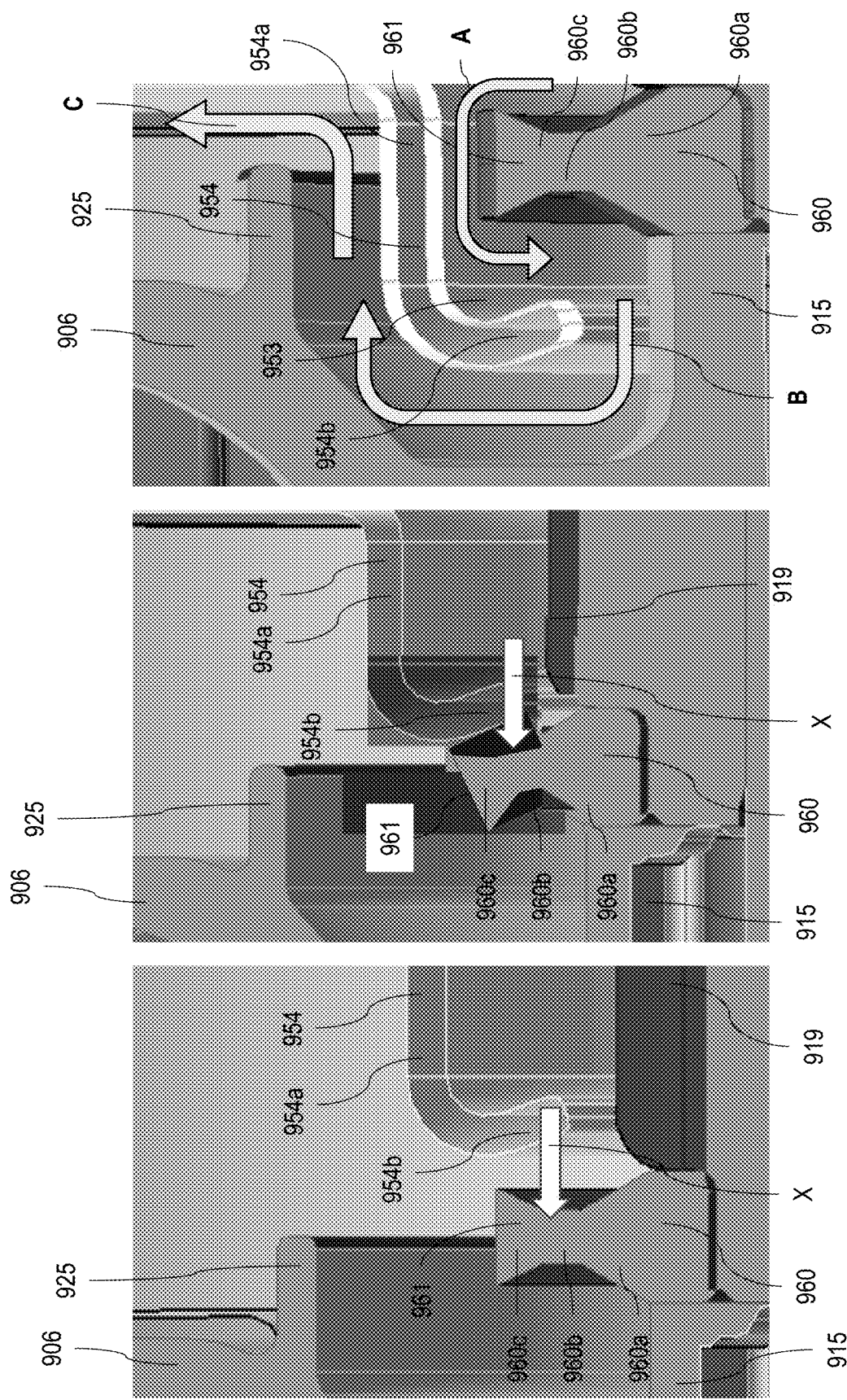

US 11,813,729 B2

POWER TOOL WITH PARTITION ASSEMBLY BETWEEN TRANSMISSION AND MOTOR

RELATED APPLICATIONS

This application claims priority, as a continuation-in-part, of U.S. patent application Ser. No. 15/978,258, filed May 14, 2018, which is incorporated by reference.

TECHNICAL FIELD

This application generally relates to a power tool with a partition between a transmission assembly and a motor assembly to inhibit dust and grease migration between them.

BACKGROUND

Various power tools, including drills, hammer drills, screwdrivers, and impact drivers are known in the art. These power tools generally have a motor assembly that is drivingly coupled to a transmission assembly. A cover on the transmission assembly and/or the motor assembly, or a partition between the transmission assembly and/or the motor assembly, may separate the transmission assembly from the motor assembly and retain the components of these assemblies.

SUMMARY

In an aspect, a power tool includes a tool housing and a motor assembly received in the tool housing. The motor assembly has a rear end portion, a front end portion, and a motor output shaft. A transmission housing is coupled to the motor housing in which a transmission is received. A motor output shaft is drivingly coupled to the transmission. A partition assembly includes a rear cover covering a rear end portion of the transmission housing that faces the front end portion of the motor. The rear cover and the front end portion together define at least a first labyrinth path and a second labyrinth path therebetween configured to inhibit grease or dust migration between the transmission housing and the motor assembly.

Implementations of this aspect may include one or more of the following features. The first labyrinth path may define at least a first undulation. The second labyrinth path may define at least a second undulation. The front end portion of the motor may include a fan coupled to the output shaft for cooling the motor. The first labyrinth path may be defined by a first projection on one of the cover and the first end portion of the motor and that is received in a first recess in the other of the cover and the first end portion of the motor. The second labyrinth path may be defined by a second projection on one of the cover and the first end portion of the motor and that is received in a second recess in the other of the cover and the first end portion of the motor. The rear cover may include a first plate received over the rear end portion of the transmission housing and a second plate received over the first plate. The first plate may define the first labyrinth path and the second plate may define the second labyrinth path. The first plate may have a first central opening for receiving the motor output shaft and a first projection at least partially surrounding the first central opening and projecting rearward into a first recess in the front end portion of the motor assembly to define the first labyrinth path. The second plate may have a second central opening for receiving the first projection of the first plate, and a second projection at least partially surrounding the second central opening and projecting rearward into a second recess in the front end portion of the motor assembly to define the second labyrinth path. The cover may have at least one leg on an outer periphery of the cover that extends axially forward to snap fit onto the rear end portion of the motor housing. A seal may be disposed between a front face of the rear cover and the rear end portion of the transmission housing to further inhibit grease or dust migration between the transmission housing and the motor assembly. The seal may be integrally formed with one of the front face of the rear cover and the rear end portion of the transmission housing. A gear of a first stage of the transmission assembly may abut the rear cover to facilitate heat transfer from the transmission assembly.

In another aspect, a power tool includes a tool housing and a motor assembly received in the tool housing. The motor assembly has a rear end portion, a front end portion, and a motor output shaft. A transmission housing is coupled to the motor housing. A transmission is received in the transmission housing. The motor output shaft is drivingly coupled to the transmission. A partition assembly includes a rear cover covering a rear end portion of the transmission housing that faces the front end portion of the motor. The rear cover includes a first plate having a first projection defining a first central opening for receiving the motor output shaft, and a second plate having a second projection defining a second central opening for receiving the first projection, the first and second plates configured to inhibit grease or dust migration between the transmission housing and the motor assembly.

Implementations of this aspect may include one or more of the following features. The second plate may be layered over the first plate between the first plate and the motor assembly. The second plate may be configured to retain both the first plate and the second plate on the rear end portion of the transmission housing. The cover may have at least one leg on an outer periphery of the cover that extends axially forward to snap fit onto the rear end portion of the motor housing. The first projection may be received in a first recess in the front end portion of the motor assembly to define a first labyrinth path therebetween. The second projection may be received in a second recess in the front end portion of the motor assembly to define a second labyrinth path therebetween. The first labyrinth path may define at least a first undulation and the second labyrinth path may define at least a second undulation. The front end portion of the motor may include a fan coupled to the output shaft for cooling the motor and define a first recess that receives the first projection. The fan may define a second recess that receives the second projection. A seal may be disposed between a front face of the rear cover and the rear end portion of the transmission housing to further inhibit grease or dust migration between the transmission housing and the motor assembly. The seal may be integrally formed with one of the front face of the rear cover and the rear end portion of the transmission housing.

In another aspect, a power tool includes a tool housing and a motor assembly received in the tool housing. The motor assembly has a rear end portion, a front end portion, a motor output shaft, and a fan coupled to the front end portion and rotatably driven by the motor output shaft. A transmission housing is coupled to the motor housing with a transmission received in the transmission housing to which the motor output shaft is drivingly coupled. A partition assembly includes a rear cover covering a rear end portion of the transmission housing that faces the fan. The rear cover includes a first plate having a first projection defining a first central opening that receives the motor output shaft and that is received in a first recess in the fan to define a first labyrinth path therebetween, and a second plate having a second projection defining a second central opening that receives the first projection and that is received in a second recess in the fan to define a second labyrinth path therebetween to inhibit grease or dust migration between the transmission housing and the motor assembly.

In another aspect, a power tool includes a tool housing and a motor assembly received in the tool housing. The motor assembly has a rear end portion, a front end portion, and a motor output shaft. A transmission housing is coupled to the motor housing with a transmission received in the transmission housing. A partition assembly includes a sealing ring and a rear cover covering a rear end portion of the transmission housing that faces the front end portion of the motor. The rear cover of the transmission housing and the front end portion of the motor together define a first labyrinth path. The partition assembly is configured to inhibit grease or dust migration between the transmission housing and the motor assembly.

Implementations of this aspect may include one or more of the following features. The front end portion of the motor may include a fan coupled to the output shaft for cooling the motor. The first labyrinth path may be defined by a first annular projection on the cover that is received in a first annular recess in the fan. The first annular recess may define an undercut configured to further inhibit grease or dust migration. The first labyrinth path may define at least a first undulation. A second labyrinth path may be defined between the rear cover of the transmission housing and the front end portion of the motor to inhibit grease or dust migration between the transmission housing and the motor assembly. The second labyrinth path may define at least a second undulation. The rear cover may include a first plate received over the rear end portion of the transmission housing and a second plate received over the first plate. The first plate may define the first labyrinth path and the second plate may define the second labyrinth path. The first plate may include a first central opening for receiving the motor output shaft and a first projection at least partially surrounding the first central opening and projecting rearward into a first recess in the front end portion of the motor assembly to define the first labyrinth path. The second plate may include a second central opening for receiving the first projection of the first plate, and a second projection at least partially surrounding the second central opening and projecting rearward into a second recess in the front end portion of the motor assembly to define the second labyrinth path. The transmission assembly may include an input sun gear to which the motor output shaft is drivingly coupled. The sealing ring may be disposed on the input sun gear. The cover may include a first annular projection and the sealing ring may be coupled to the first annular projection. A seal may be disposed between a front face of the rear cover and the rear end portion of the transmission housing to further inhibit grease or dust migration between the transmission housing and the motor assembly. The seal may be integrally formed with one of the front face of the rear cover and the rear end portion of the transmission housing.

In another aspect, a power tool includes a tool housing and a motor assembly received in the tool housing. The motor assembly has a rear end portion, a front end portion, a motor output shaft, and a fan coupled to the motor output shaft adjacent the front end portion. A transmission housing is coupled to the motor housing with a transmission having a plurality of gears received in the transmission housing and to which the motor output shaft is drivingly coupled. A partition assembly includes a rear cover covering a rear end portion of the transmission housing that faces and is adjacent the fan of the motor and that is configured to abut against at least one of the gears of the transmission assembly to facilitate heat transfer from the transmission assembly.

Implementations of this aspect may include one or more of the following features. The rear cover and the fan together may define a first labyrinth path therebetween configured to inhibit grease or dust migration between the transmission housing and the motor assembly. The first labyrinth path may be defined by a first projection on one of the cover and the fan and that is received in a first recess in the other of the cover and the fan. The rear cover and the fan together may define a second labyrinth path therebetween configured to inhibit grease or dust migration between the transmission housing and the motor assembly. The second labyrinth path may be defined by a second projection on one of the cover and the fan and that is received in a second recess in the other of the cover and the fan. The rear cover may include a first plate received over the rear end portion of the transmission housing and a second plate received over the first plate. The first plate may be configured to abut the gear. The first plate may have a first central opening for receiving the motor output shaft and a first projection at least partially surrounding the first central opening and projecting rearward into a first recess in the fan to define a first labyrinth path. The second plate may have a second central opening for receiving the first projection of the first plate, and a second projection at least partially surrounding the second central opening and projecting rearward into a second recess in the fan. The cover may have at least one leg on an outer periphery of the cover that extends axially forward to snap fit onto the rear end portion of the motor housing. A seal may be disposed between a front face of the rear cover and the rear end portion of the transmission housing to further inhibit grease or dust migration between the transmission housing and the motor assembly. The seal may be integrally formed with one of the front face of the rear cover and the rear end portion of the transmission housing.

Advantages may include one or more of the following. The partition between the transmission assembly and the motor assembly may reduce or inhibit grease migration and dust contamination between the transmission assembly and the motor assembly. The partition also may help facilitate alignment between the motor assembly and the transmission assembly. In addition, the partition may facilitate heat transfer from the hottest portion of the transmission. These and other advantages and features will be apparent from the description, the drawings, and the claims.

BRIEF DESCRIPTION OF THE DRAWINGS

FIGS. 22A-22C are close-up cross-section views of the partition assembly with seal of FIG. 20 during assembly.

DETAILED DESCRIPTION

Figure 1:
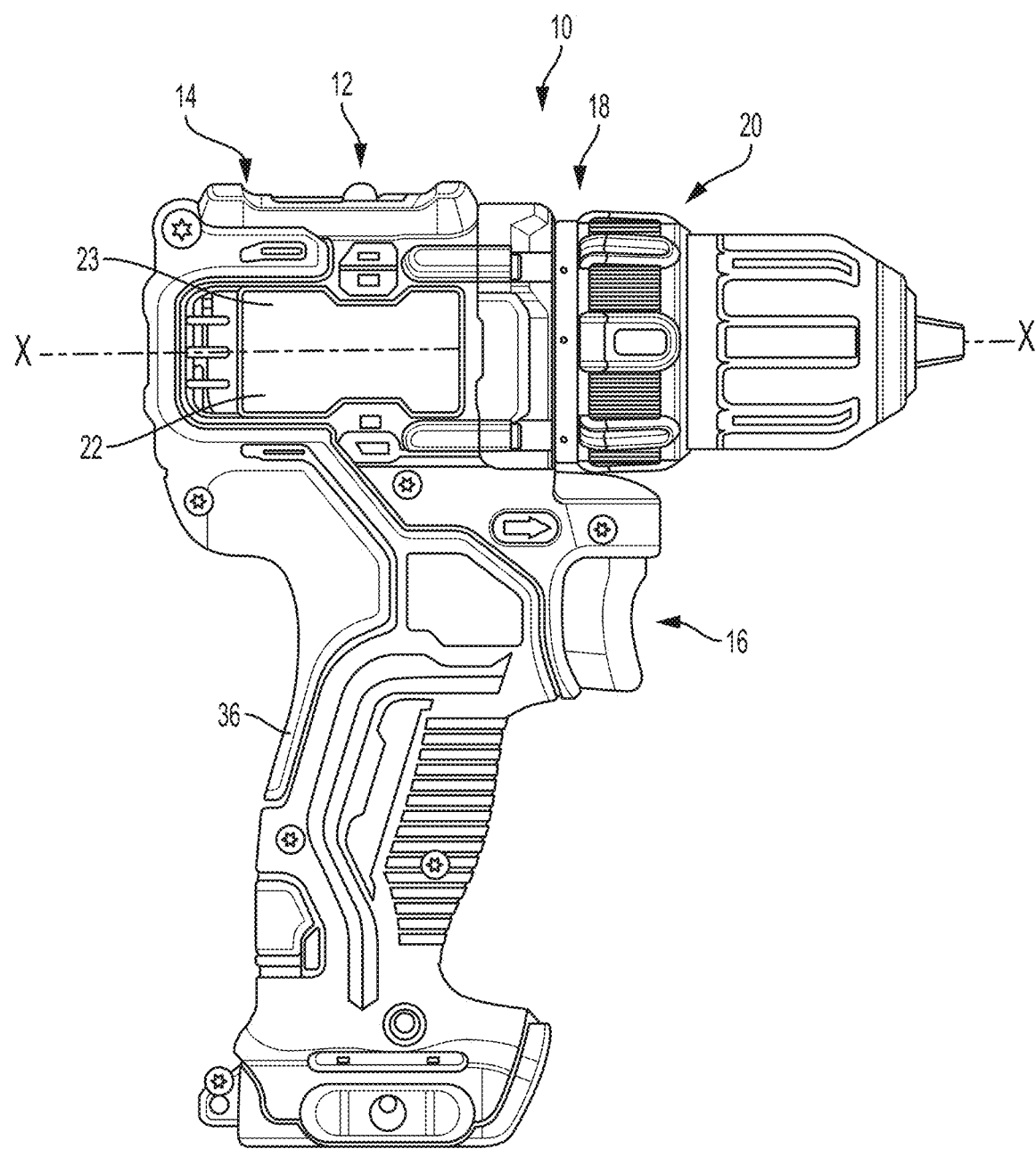
FIG. 1 is a side plan view of an embodiment of a power tool.
Figure 2:
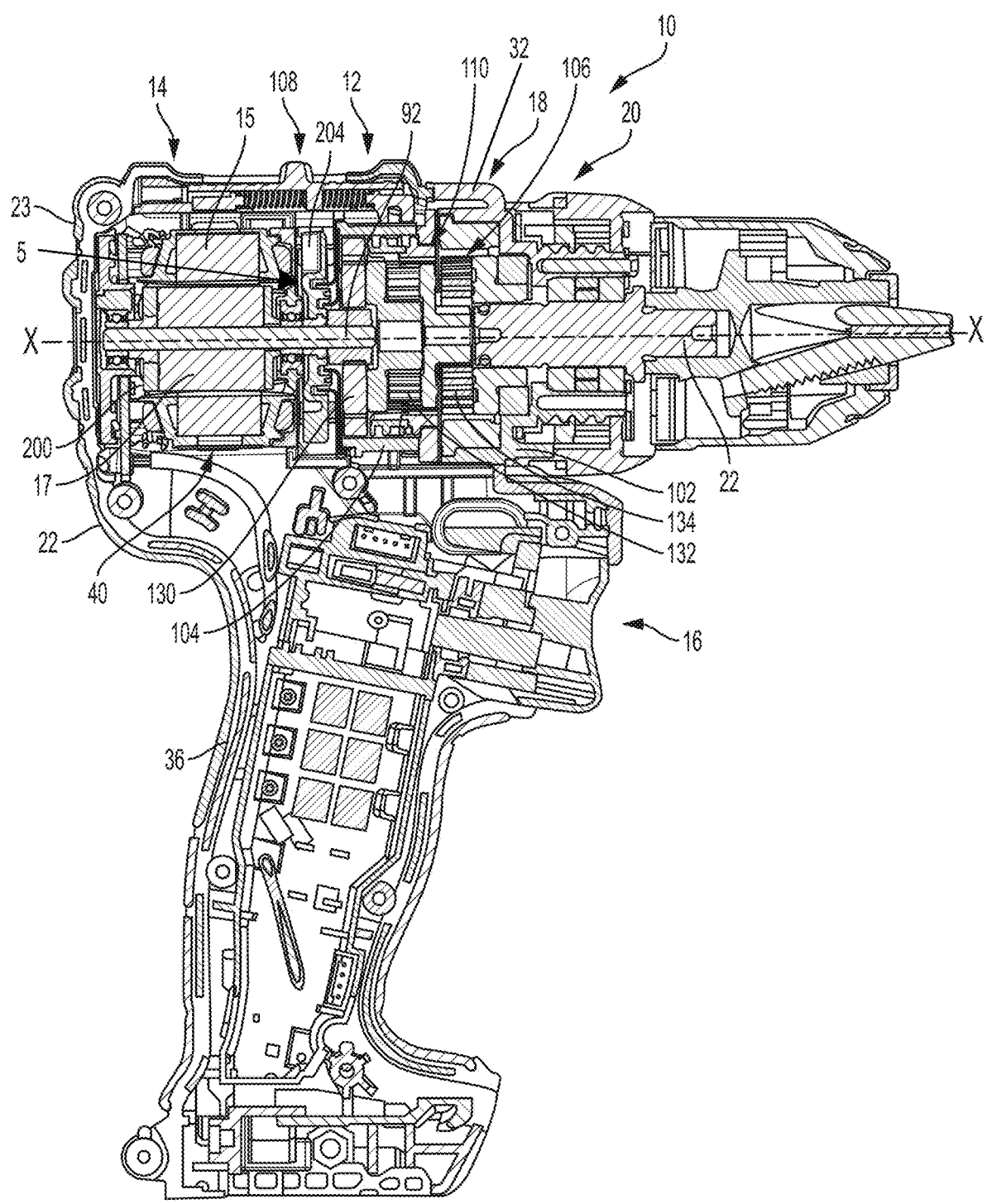
FIG. 2 is a side cross-sectional view of the power tool of FIG. 1.

Referring to FIGS. 1 and 2, in an embodiment, a power tool 10 includes a housing assembly 12, a motor assembly 14, a trigger assembly 16, a transmission assembly 18, a clutch assembly 20, and an output spindle 22 extending along a longitudinal axis X. The housing assembly 12 comprises a pair of handle housing shells 23 that together form a tool housing 22. The tool housing 22 defines a handle 36 and a motor cavity 40 into which the motor assembly 14 is received. The motor assembly 14 includes a rear end portion 200, a front end portion 204, an outer stator 15, an inner rotor 17, and an output shaft 92 coupled to the rotor 17 and extending along the longitudinal axis X to provide a rotary input torque to the transmission assembly 18. The transmission assembly 18 includes a generally tubular transmission housing 32 that can be removably coupled to the tool housing 22, e.g., via a plurality of threaded fasteners (not shown). The transmission housing 32 contains a speed reduction gearset 106 configured to transmit rotary power from the motor output shaft 92 to the output spindle 22. The transmission housing 32 has a generally tubular front wall portion 102 and a generally tubular rear wall portion 104, which may be removably attached to each other, e.g., by threaded fasteners, or which may be integral. At least part of the front wall portion 104 forms a portion of the exterior of the power tool 10.

The speed reduction gearset 106 may be a multi-speed gearset, and in the illustrated example, comprises a three-stage, two-speed planetary transmission 108. The transmission 110 has a first stage 130, a second stage 132 and a third stage 134, with the first and second stages 130 and 132 disposed in the rear wall portion 104, and the third stage 134 disposed in the front wall portion 102. Each stage 130, 132, 134 includes a sun gear meshed with a plurality of planet gears and a ring gear surrounding and meshed with the planet gears. For example, the first stage 130 includes a sun gear 280 mounted on the output shaft 92, a plurality of planet gears 282 meshed with the sun gear 280, and a ring gear 283 surrounding and meshed with the planet gears 282. The transmission assembly 18 may also include a speed selector mechanism 108 configured to change the speed reduction ratio of the speed reduction gearset 106. Further details regarding the housing assembly 12, motor assembly 14, trigger assembly 16, transmission assembly 18, clutch assembly 20, and output spindle 22 may be found in U.S. Pat. No. 9,481,080, which is incorporated by reference.

Referring also to FIGS. 3A-8, in an embodiment, a partition assembly 5 between the motor assembly 14 and the transmission assembly 18 comprises a fan 206 on a front end portion of the motor assembly 14 and a rear cover 240 on a rear end 242 of the transmission assembly 18. The fan 206 is rotatably driven by the motor output shaft 92 in order to cool the motor assembly 14. The fan 206 has a generally disk shaped body 205 with a central hub 214 that is keyed to the output shaft 92 via a keyway 216, a front face portion 208 that faces toward the transmission assembly 18, and a rear face portion 210 that faces toward the remainder of the motor assembly 14. The rear face portion 210 carries a plurality of fan blades 212 configured to blow cooling air over the motor assembly 14 when the output shaft 92 rotates. The front face portion 208 has a generally flat annular wall 218 with a first annular recess 220 located radially outward from the hub 214 at a first radial distance R1 from the longitudinal axis X and a second annular recess 222 located radially outward from the hub 214 at a second radial distance R2 from the longitudinal axis X is greater than the first radial distance R1. The first annular recess 220 is bounded by a first inner radial wall 224, a first outer radial wall 226, and a first annular wall 228, and has a first height H1 and a first depth D1. The second annular recess 222 is bounded by a second inner radial wall 230, a second outer radial wall 232, and a second annular wall 234, and has a second height H2 that is less than the first height H1, and a second depth D2 that is greater than the first depth D1. In other embodiments, the first height H1 may be less than or equal to the second height H2 and the first depth D1 may be greater than or equal to the second depth D2.

The rear cover 240 covers the rear end 242 of the generally tubular rear portion 104 of the transmission housing 32. The cover 240 is generally disk shaped and has a central aperture 248 that receives the motor output shaft 92, a front face 244 that faces the reduction gearset 110, a rear face 246 that faces the fan 206, and a peripheral edge portion 250 that couples the rear cover 240 to the tubular rear portion 104 of the transmission housing 32. The rear face 246 includes a first annular projection 252 and a second annular projection 254 extending rearward from the rear face 246. The first annular projection 252 defines the central aperture 248 and is configured to be received in the first annular recess 220 of the fan 204. The second annular projection 254 is configured to be received in the second annular recess 222 of the fan 204.

In the illustrated embodiment, the rear cover 240 is formed in two parts that comprise a first cover plate 260 and a second or outer cover plate 270. The first cover plate 260 is disk-shaped with the first annular projection 252 on its inner periphery that surrounds the central aperture 248. The first cover plate 260 also has a plurality of first legs 262 extending axially forward from an outer peripheral edge 264 of the first cover plate 260. The first legs 262 are configured to be received in corresponding grooves 266 in an outer surface 268 of the rear wall portion 104 of the transmission housing 32 to inhibit relative rotation between the first cover plate 260 and the transmission housing 32. The second cover plate 270 is disk-shaped with the second annular projection 254 on its inner periphery surrounding a central opening 272 that is larger than the central aperture 248. The second cover plate 270 also has a plurality of second legs 274 extending axially forward from the outer peripheral edge portion 250 of the second cover plate 270. Each of the second legs 274 defines an enclosed slot 276 that is configured to receive a ramped protrusion 278 on the outer surface 268 of the rear wall portion 104 of the transmission housing 32 in a snap-fit connection to rotationally and axially secures the second cover plate 270 to the transmission housing 32. In the illustrated embodiment, the cover 240 is composed of separate first and second cover plates 260, 270 as it is less costly to manufacture the plates individually out of individual pieces of sheet metal. However, as described below, in other embodiments, the cover 240 may be formed of a single integral piece of material. In addition, the cover 240 may be attached to the transmission housing 32 by other types of connections such as by a bayonet-type connection, by threaded fasteners, by being welded, or by using an adhesive. Also, the cover plates 260, 270 may be affixed to one another, e.g., by threaded fasteners, welding, or adhesive.

Figure 3A:
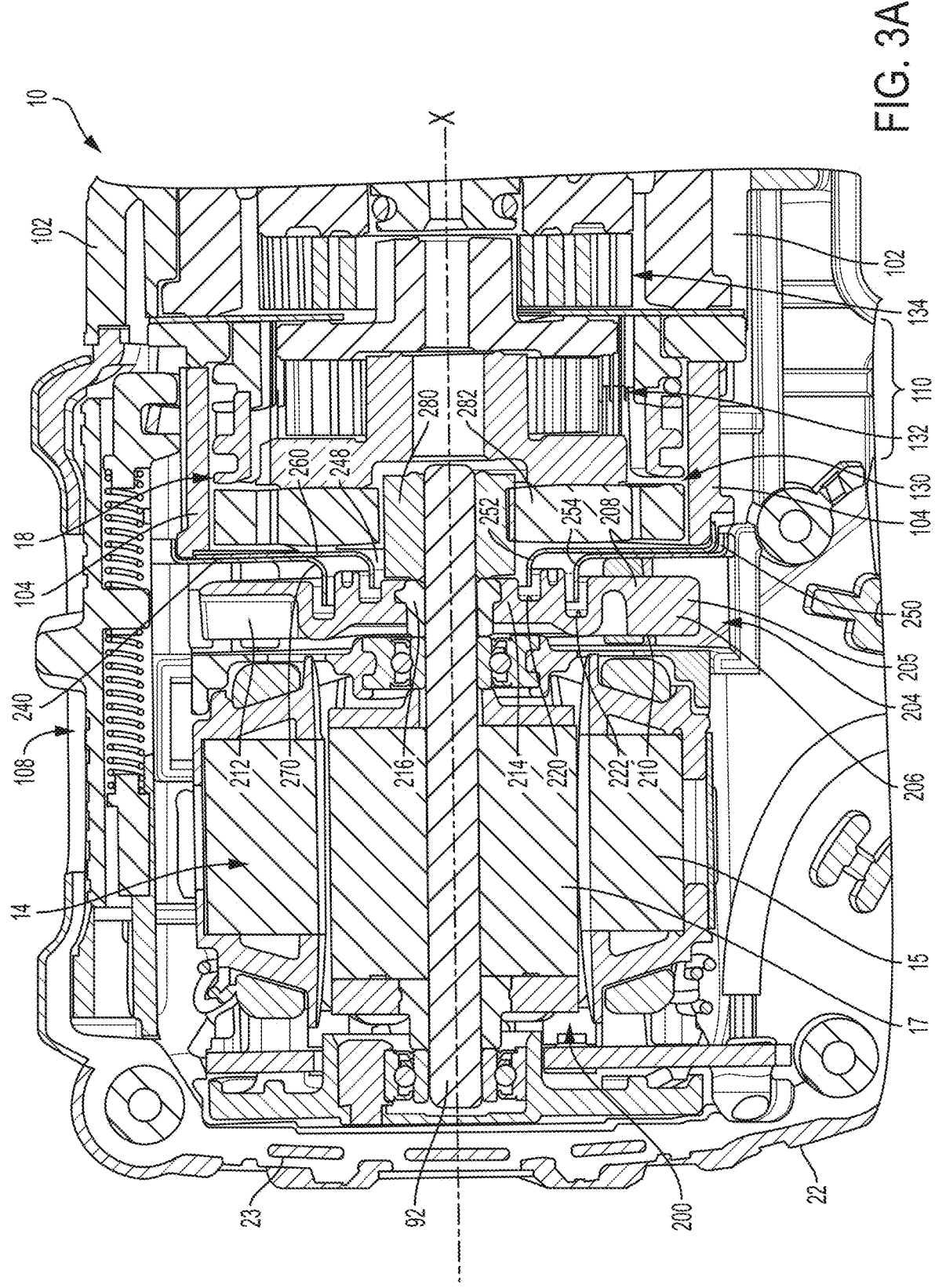
FIG. 3A is a close-up side cross-sectional view of the power tool of FIG. 1 showing a motor assembly, a transmission assembly, and an embodiment of a partition assembly between the motor assembly and the transmission assembly.
Figure 3B:
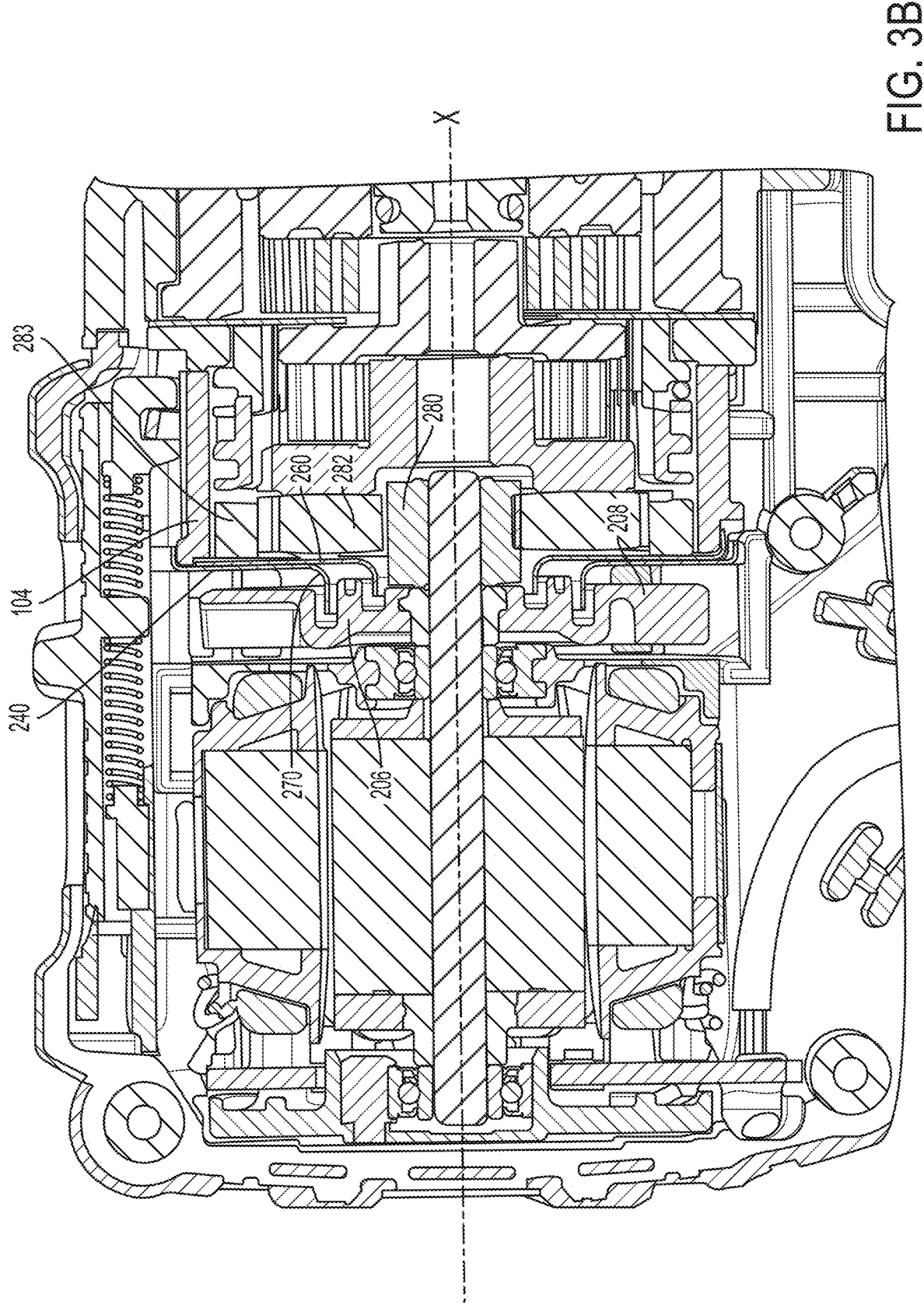
FIG. 3B is a close-up side cross-sectional view similar to FIG. 3B, showing a ring gear of the transmission assembly abutting the partition assembly.
Figure 4:
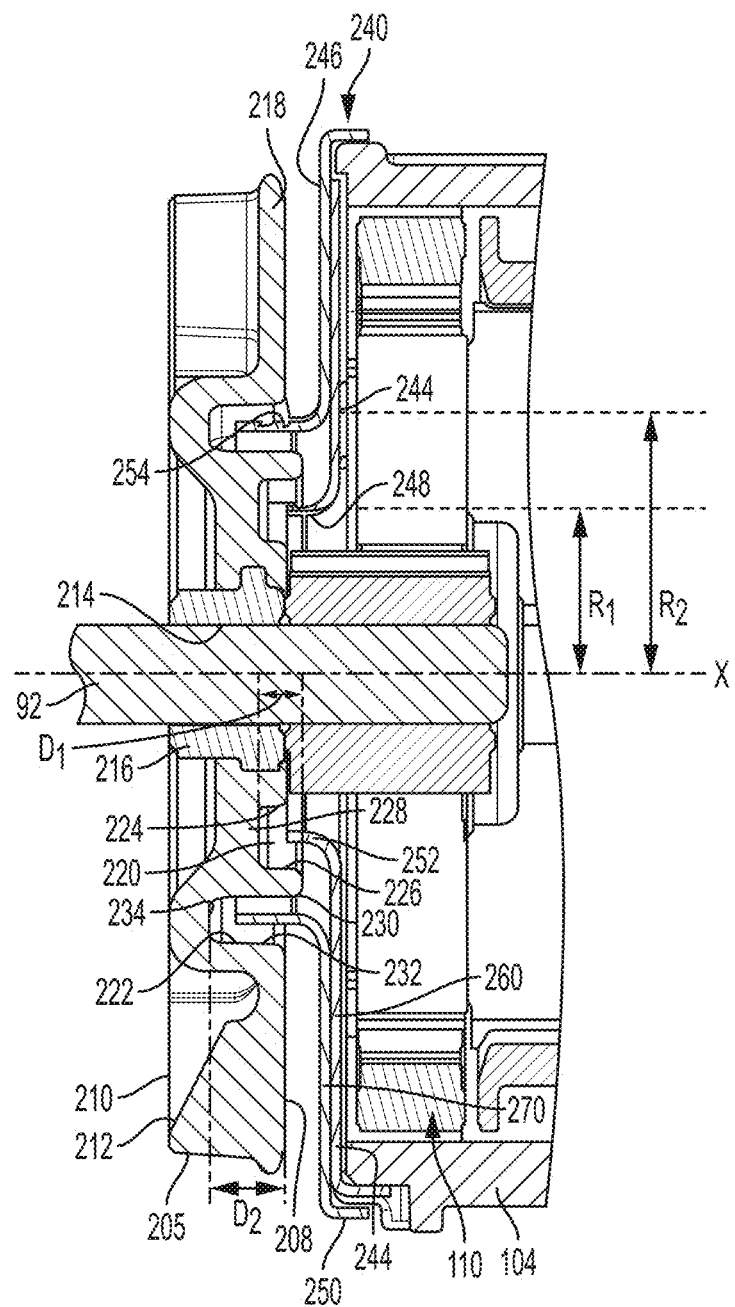
FIG. 4 is a close-up side cross-sectional view of a motor fan and the partition assembly of FIG. 3.
Figure 5:
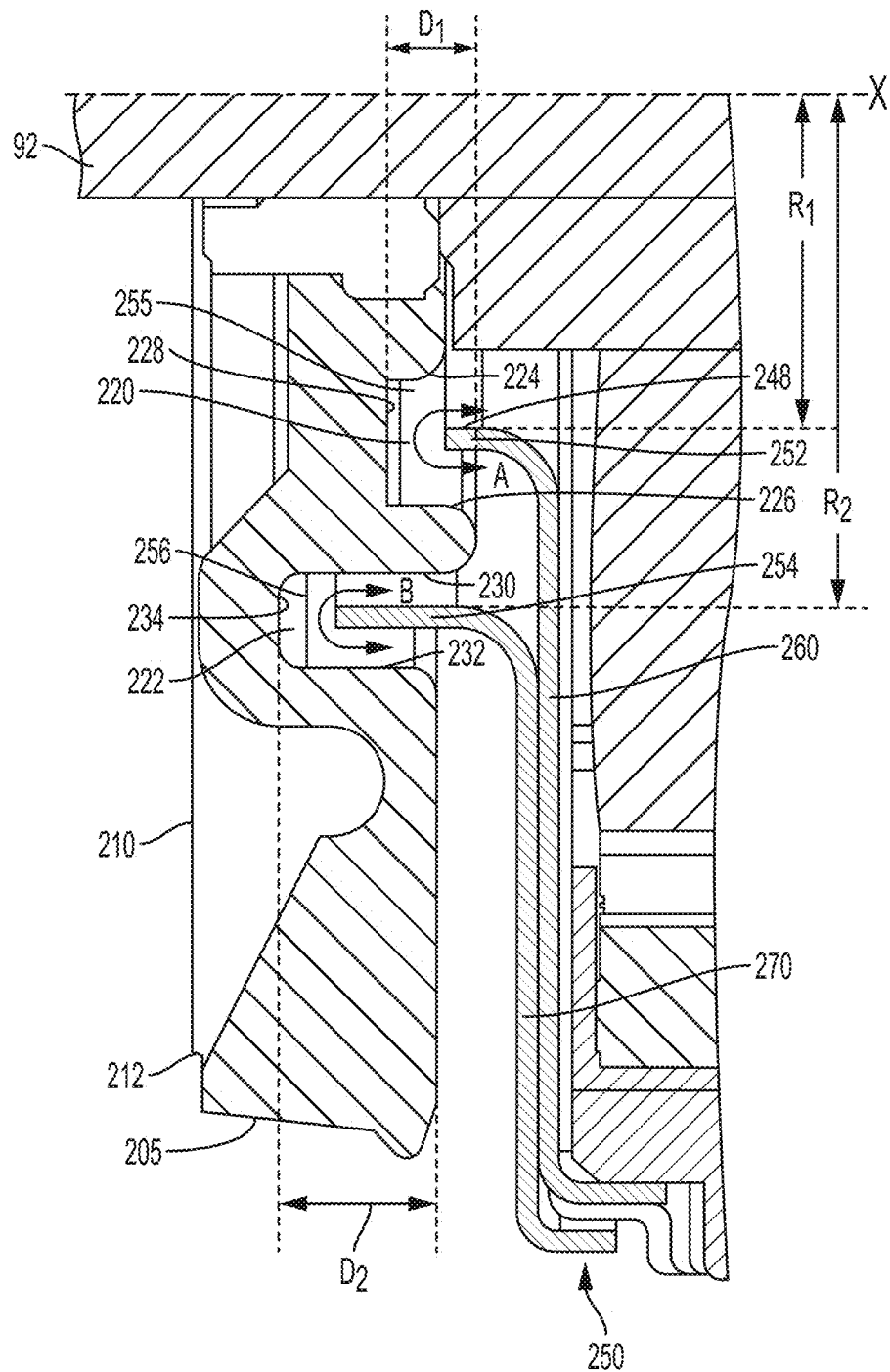
FIG. 5 is a close up side cross-sectional view of a portion of the motor fan and the partition assembly of FIG. 3.
Figure 6:
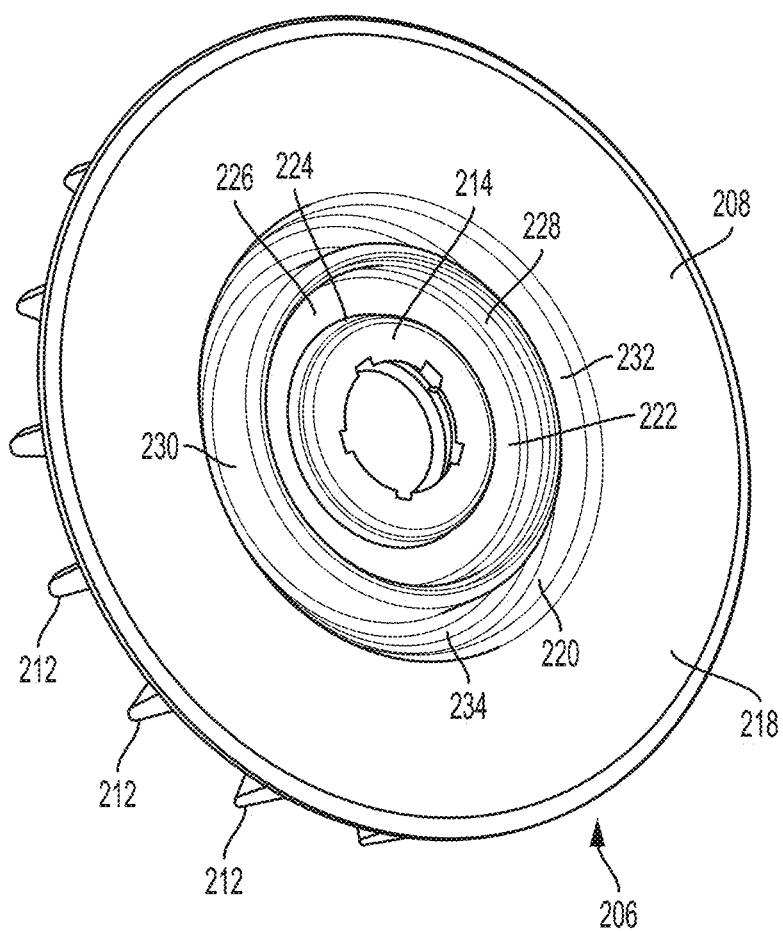
FIG. 6 is a perspective view of the motor fan of FIG. 3.
Figure 7:
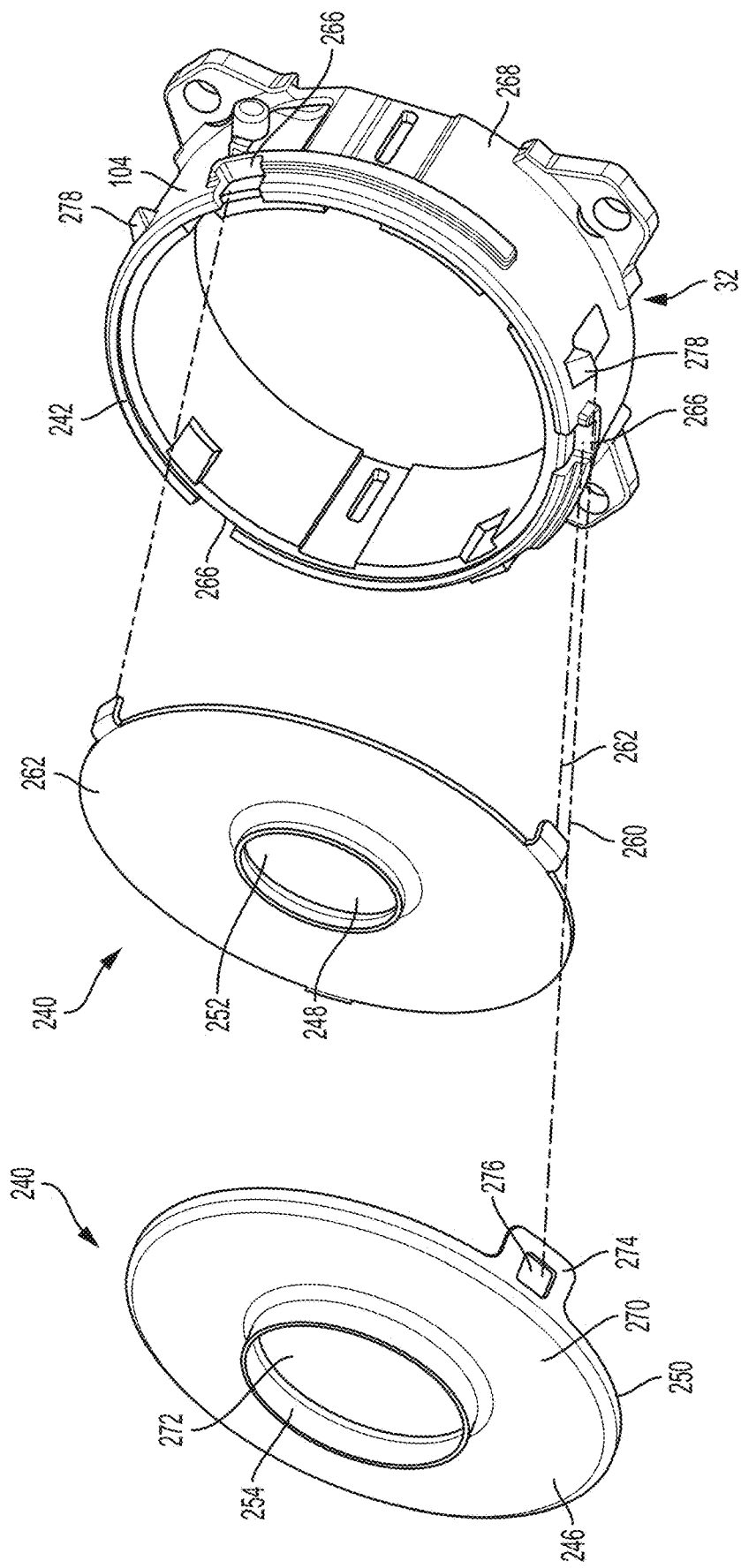
FIG. 7 is an exploded perspective view of the partition assembly and transmission housing of FIG. 3.
Figure 8:
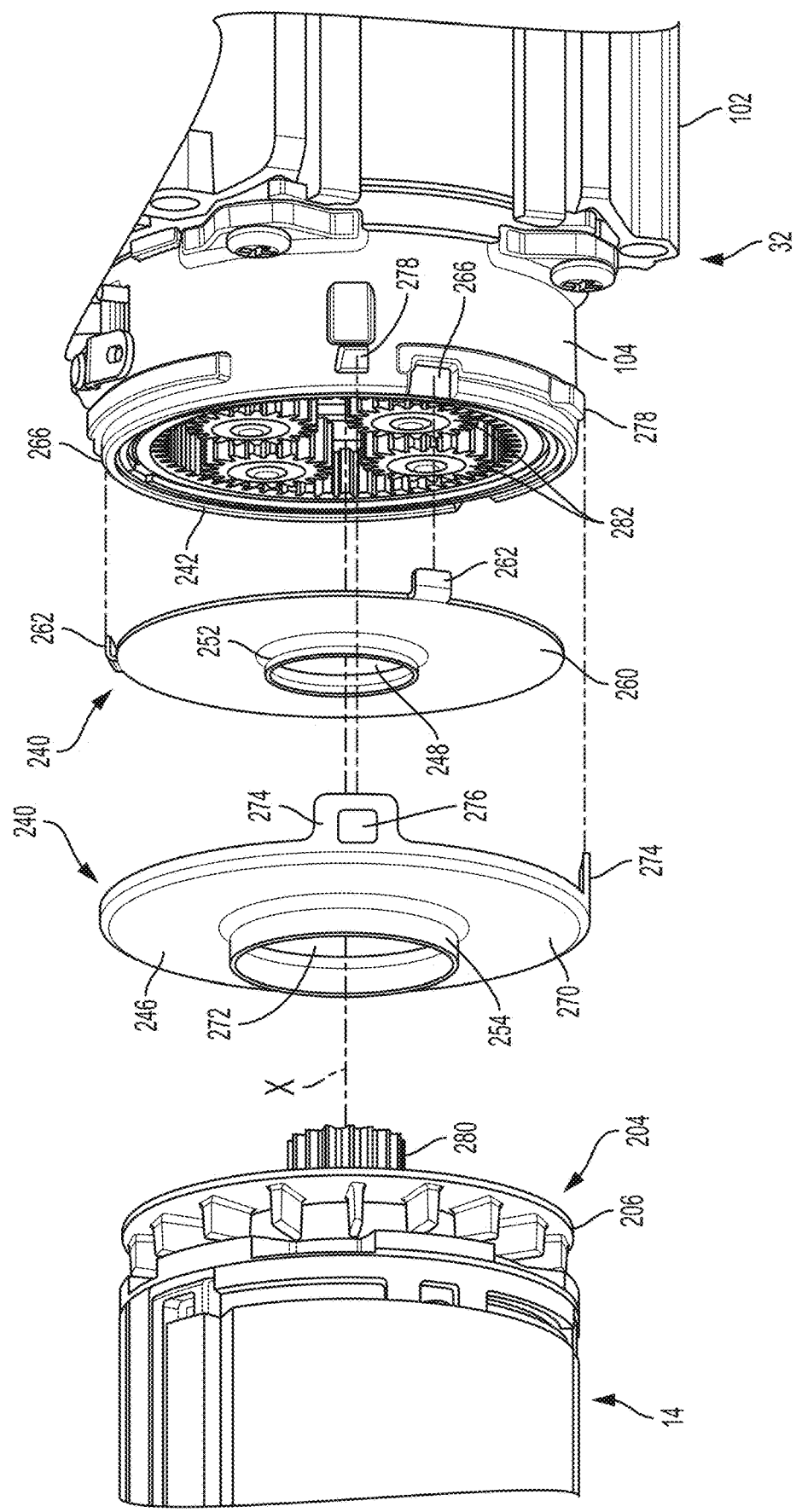
FIG. 8 is an exploded perspective view of the motor assembly, transmission assembly, and partition assembly of FIG. 3.

As shown in FIG. 3B, the rear cover 240 is metal and is mounted to the transmission housing 32 so that the first stage ring gear 283 can abut against the rear cover 240, with the rear cover very close to the fan 206. This facilitates superior heat dissipation from the first stage 130 of the transmission assembly, which tends to be the hottest portion of the transmission assembly during operation.

To assemble the motor assembly 14 and the transmission assembly 18, the first cover plate 260 is non-rotationally coupled to the rear end 242 of the transmission housing 32 by inserting the first legs 262 into the grooves 266. Next, the second cover plate 270 is placed over and abutting the first cover plate 260 and the second legs 274 are rotationally and axially secured to the rear end 242 of the transmission housing 32 by snap-fitting the second legs 274 over the ramped protrusions 278. After the rear cover 240 is secured to the transmission housing 32, the output shaft 92 of the motor assembly 14 is inserted through the central aperture 248 of the cover 240 so that the sun gear 280 on the output shaft 92 meshes with planet gears 282 in the first stage 130 of the reduction gearset 106. At the same time, the first annular projection 252 on the cover 240 is received in the first annular recess 220 in the fan 206, and the second annular projection 254 is received in the second annular recess 222 in the fan 206. A first space 255 between the first projection 252 and the walls 224, 226, 228 that bound the first annular recess 220 defines a first labyrinth path A having a first generally U-shaped undulation. A second space 256 between the second projection 254 and the walls 230, 232, 234 that bound the second annular recess 222 defines a second labyrinth path B having a second generally U-shaped undulation.

Together, the first labyrinth path A and the second labyrinth path B of the partition assembly 5 reduce or inhibit migration of grease and dust contamination between the transmission assembly 18 and the motor assembly 14 by trapping grease and/or dust. The multiple labyrinth path is significantly more effective in trapping the grease than is a single labyrinth path. In alternate embodiments, there may be more than two labyrinth paths. In addition, one or more of the labyrinth paths may have a different configuration such as crenellated, bustrophedonic, wave-like, S-shaped, Z-shaped, and/or sinusoidal.

Figure 9:
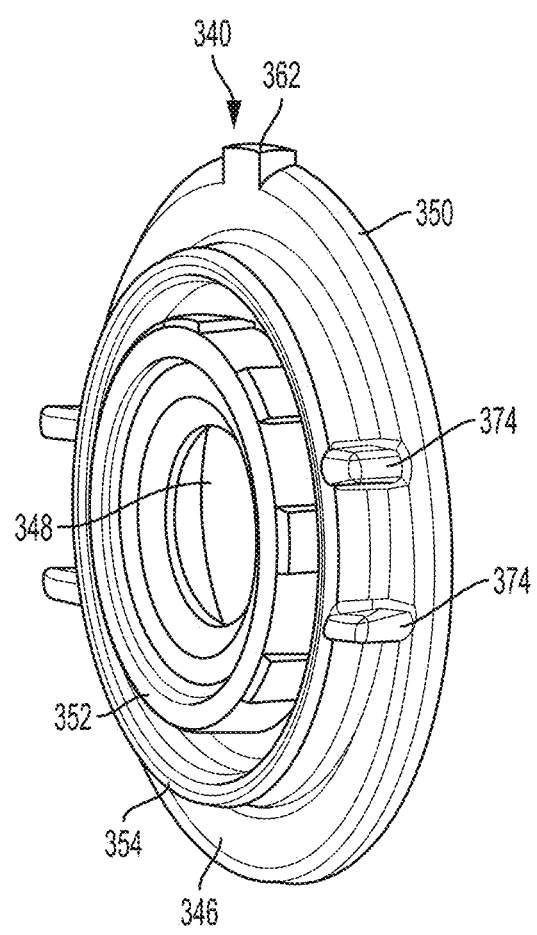
FIG. 9 is an alternative embodiment of a partition assembly usable with the motor assembly and transmission assembly of FIG. 3.
Figure 10:
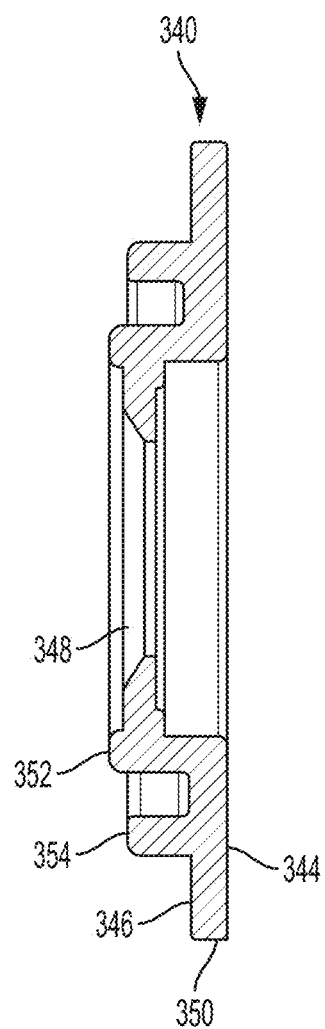
FIG. 10 is a side cross-sectional view of the cover of FIG. 9.

Referring to FIGS. 9 and 10, in another embodiment, a power tool 310 similar to power tool 10 may include a partition assembly 305 that includes the fan 206, described above, together with a one-piece or unitary cover 340 that covers the rear end 242 of the generally tubular rear portion 104 of the transmission housing 32. The cover 340 is generally disk shaped and has a central aperture 348 that receives the motor output shaft 92, a front face 344 that faces the reduction gearset 110, a rear face 346 that faces the fan 206, and a peripheral edge portion 350 that couples the cover 340 to the tubular rear portion 104 of the transmission housing 32. The rear face 346 includes a first annular projection 352 and a second annular projection 354 extending rearward from the rear face 346. The first annular projection 352 surrounds the central aperture 348 and is configured to be received in the first annular recess 220 of the fan 204. The second annular projection 354 is configured to be received in the second annular recess 222 of the fan 204. The cover 340 has one or more first legs 362 extending radially outward from an outer peripheral edge 364 of the cover 340. The legs 362 are configured to be received in corresponding grooves in the rear wall portion 104 of the transmission housing 32 to inhibit relative rotation between cover 340 and the transmission housing 32. The cover 340 also has a plurality of second legs 374 extending radially outward from the first annular projection 352 and axially rearward from the rear face 346. Each of the second legs 374 is configured to be received in corresponding grooves in the tool housing 22 (not shown) to rotationally and/or axially retain the cover 340 in the tool housing 22.

Figure 11:
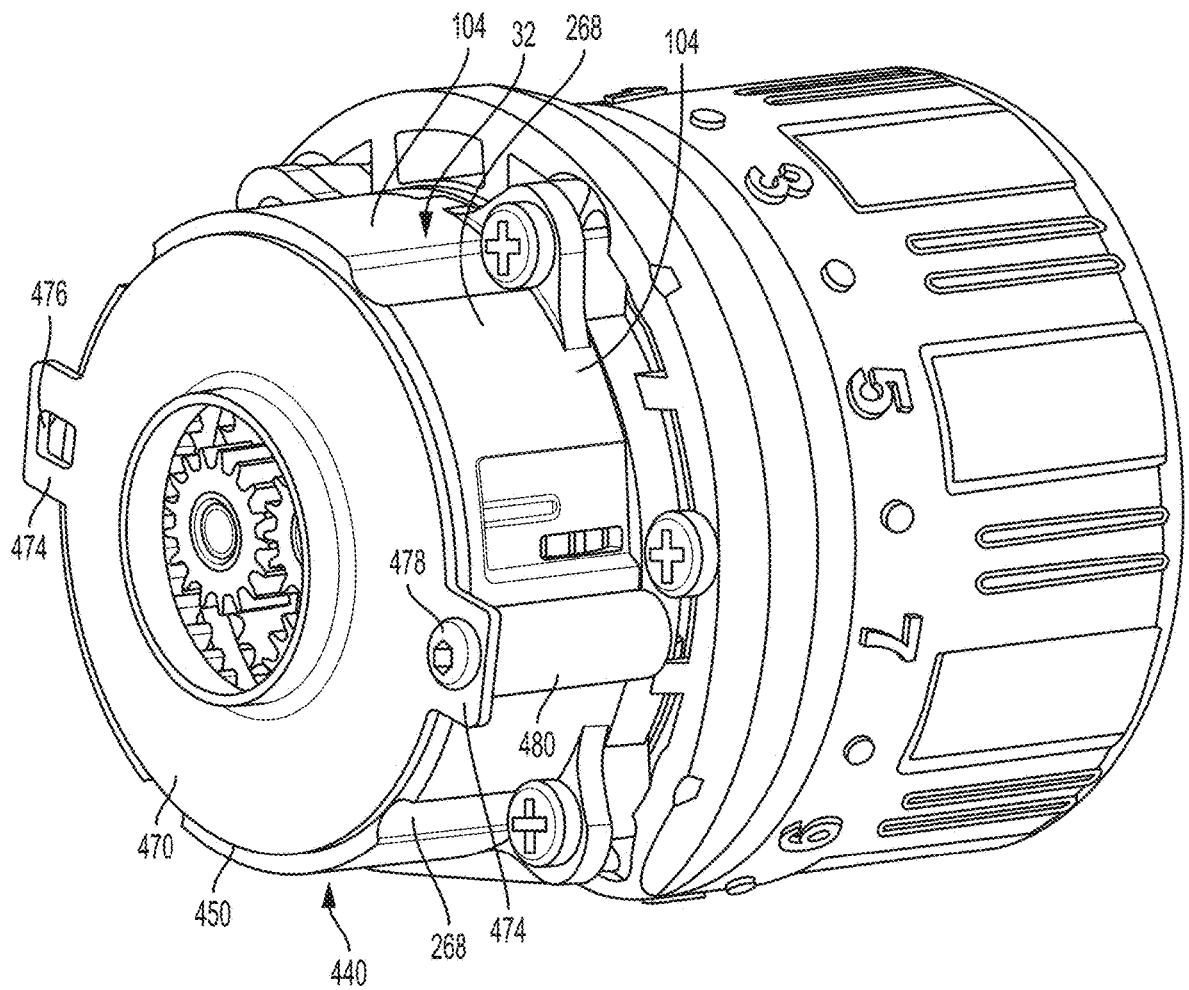
FIG. 11 is a perspective view of another alternative embodiment of a partition assembly usable with the motor assembly and transmission assembly of FIG. 3.

Referring to FIG. 11, in another embodiment, a power tool 410 similar to the power tool 10 may include a partition assembly 405 that includes the fan 206 described above and a rear cover 440, similar to the rear cover 240 of FIGS. 3-8. The rear cover 440 may comprise a first cover plate (not shown) similar to the first cover plate 260, and a second cover plate 470 similar to the second cover plate 270. The rear cover 440 differs from the rear cover 240 in that the second cover plate 470 has a plurality of second legs 474 extending radially outward from an outer peripheral edge portion 450 of the second cover plate 470. Each of the second legs 474 defines an enclosed screwhole 476 that is configured to receive a threaded fastener 478 that is also received in a screw boss 480 on the outer surface 268 of the rear wall portion 104 of the transmission housing 32 to rotationally and axially secures the second cover plate 470 to the transmission housing 32.

Figure 12:
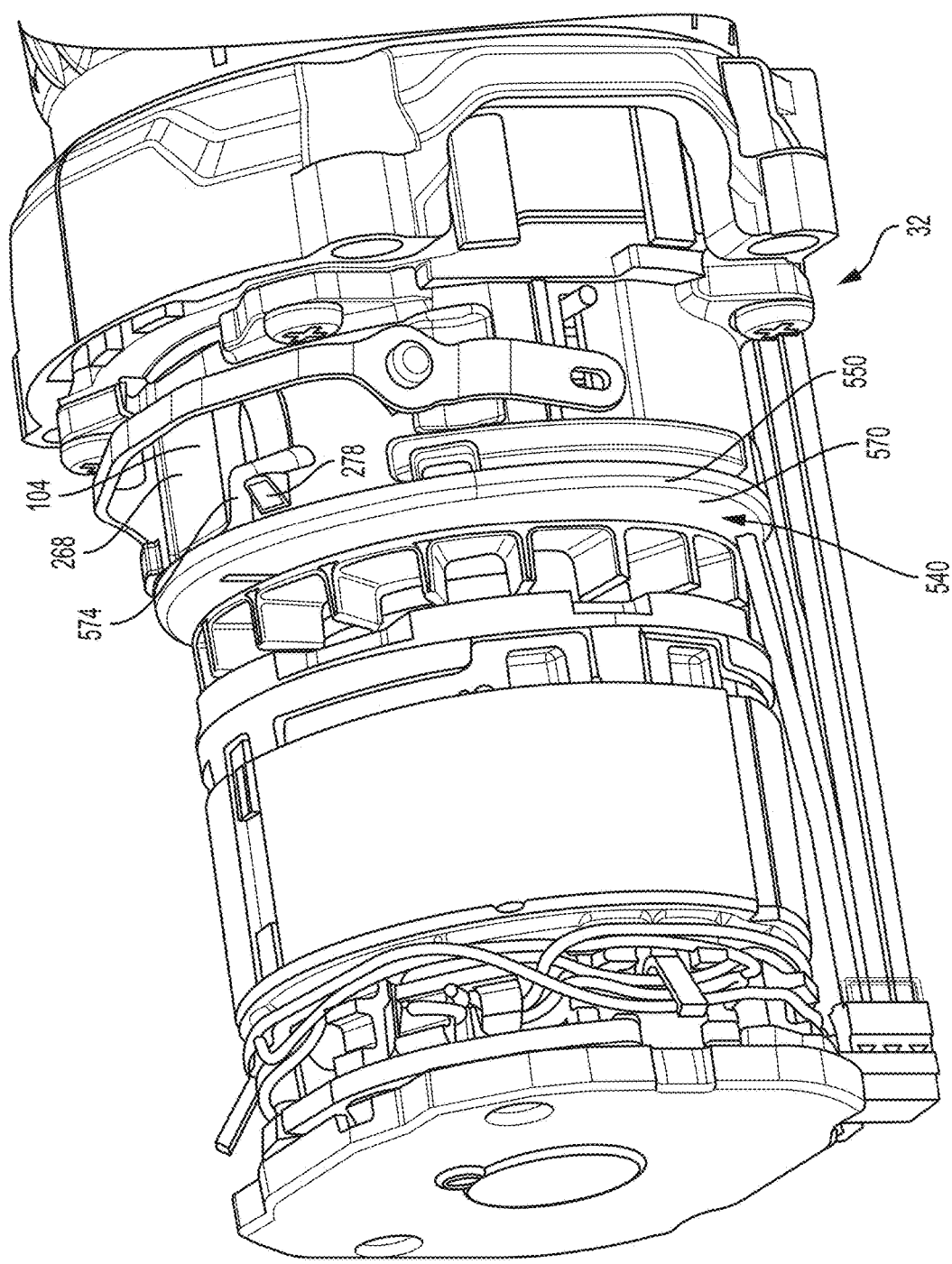
FIG. 12 is a perspective view of the motor assembly and transmission assembly of FIG. 3 with yet another alternative embodiment of the cover of the transmission assembly.

Referring to FIG. 12, in another embodiment, a power tool 510 similar to the power tool 10 may include a partition assembly 505 that includes the fan 206 described above and a rear cover 540, similar to the rear cover 240 of FIGS. 3-8. The rear cover 540 may comprise a first cover plate (not shown) similar to the first cover plate 260, and a second cover plate 570 similar to the second cover plate 270. The rear cover 540 differs from the rear cover 240 in that the second cover plate 570 has a plurality of L-shaped legs 574 extending axially forward from an outer peripheral edge portion 550 of the second cover plate 570. Each of the L-shaped legs 574 is configured to receive one of the ramped protrusions 278 that on the outer surface 268 of the rear wall portion 104 of the transmission housing 32 to rotationally and axially secure the second cover plate 570 to the transmission housing 32.

Figure 13:
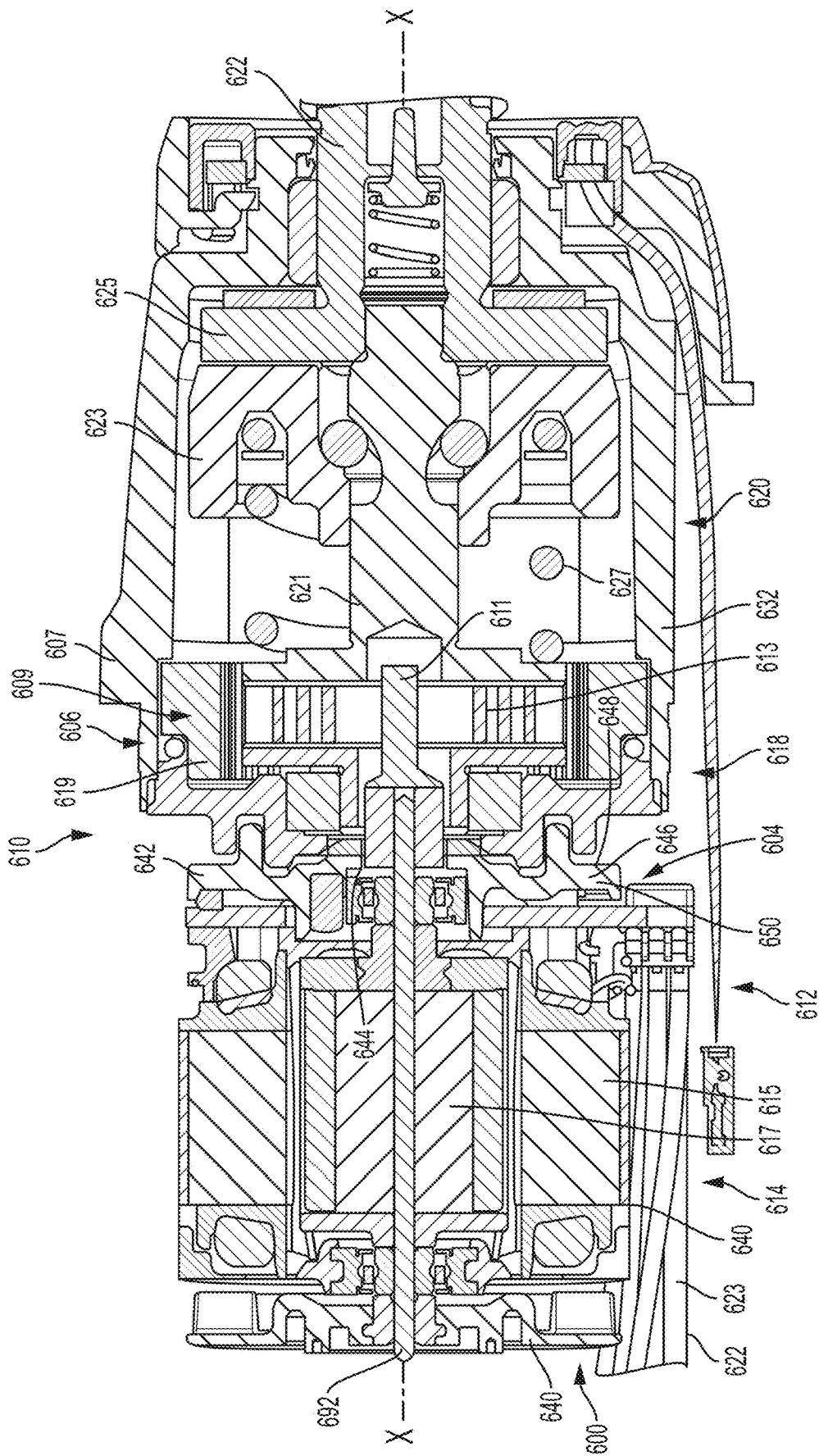
FIG. 13 is a side cross-sectional view of an alternative embodiment of a power tool having a motor assembly, a transmission assembly, and a partition assembly between the motor assembly and the transmission assembly.
Figure 14:
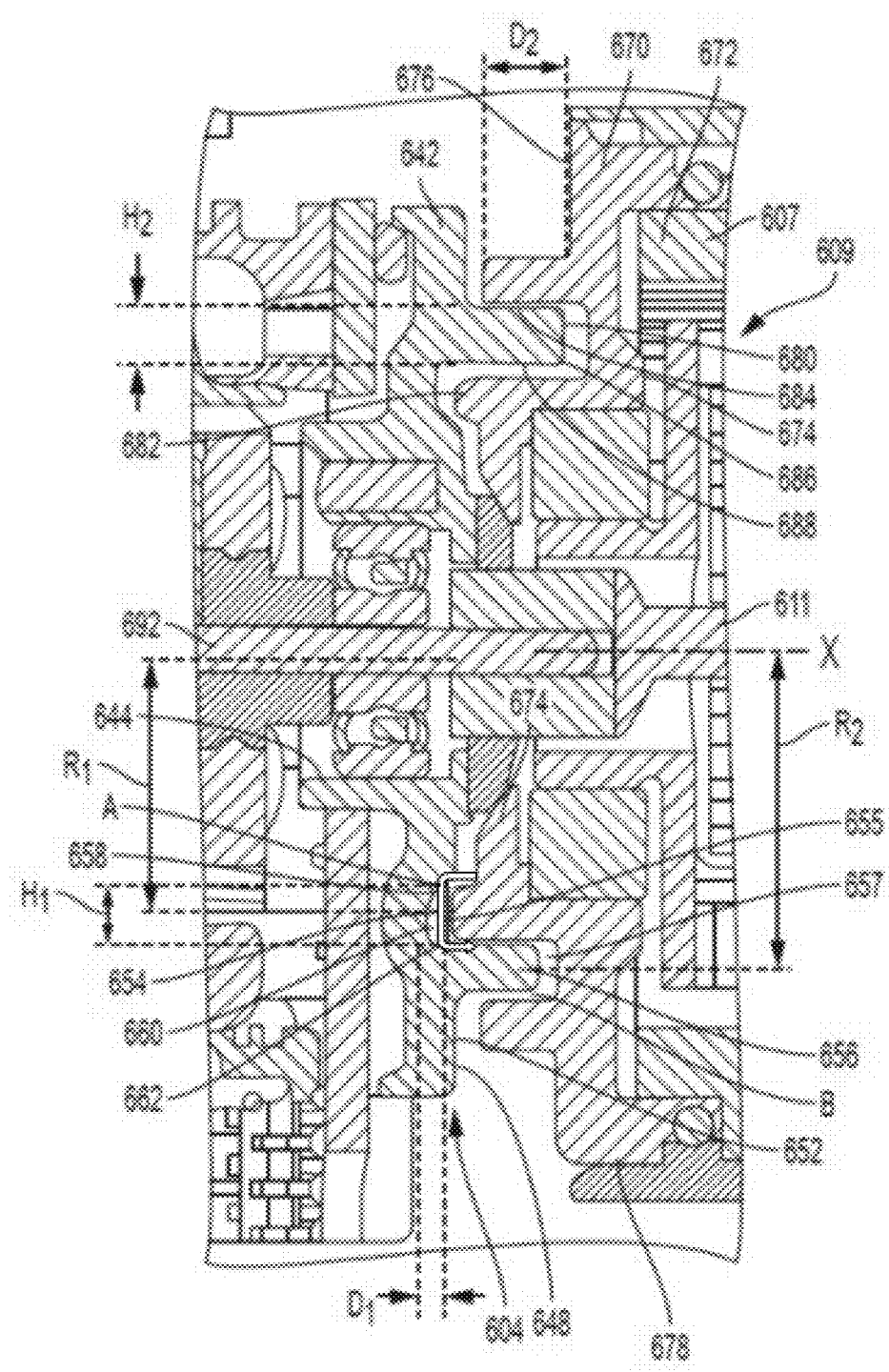
FIG. 14 is a close-up side cross-sectional view showing the cover FIG. 13.

Referring to FIGS. 13 and 14, in another embodiment, a power tool 610, different from the power tool 10, includes a housing assembly 612, a motor assembly 614, a transmission assembly 618, a rotary impact assembly 620 (including a cam carrier 621, a hammer being driven by the cam carrier 623, and an anvil 625 that can be struck by the hammer 623, and a spring 627 biasing the hammer away from the cam carrier 623), and an output spindle 622 extending along a longitudinal axis X and coupled to the anvil 625. The housing assembly 612 comprises a pair of handle housing shells 623 that together form a tool housing 622 and a handle (not shown, but similar to the handle 36 in FIGS. 1 and 2). The tool housing 622 defines a motor cavity 640 into which the motor assembly 614 is received. The motor assembly 614 includes a rear end portion 600, a front end portion 604, an outer stator 615, an inner rotor 617, and an output shaft 692 coupled to the rotor 617 and extending along the longitudinal axis X to provide a rotary input torque to the transmission assembly 618. The transmission assembly 618 includes a generally tubular transmission housing 632 that can be removably coupled to the tool housing 622, e.g., via a plurality of threaded fasteners (not shown). The transmission housing 632 contains the rotary impact assembly 620 and a speed reduction gearset 606 configured to transmit rotary power from the motor output shaft 692 to the rotary impact assembly 620. The transmission housing 632 has a generally tubular wall portion 607, at least part of which forms a portion of the exterior of the power tool 610. The speed reduction gearset 606 may be a planetary gearset 609 having an input sun gear 611, a plurality of planet gears 613 driven by the sun gear 611 and carried by the cam carrier 621 of the rotary impact assembly 620, and a stationary ring gear 619 that meshes with the planet gears 613. The speed reduction gearset 606 reduces the output speed of the motor shaft 692 and transmits rotary motion to the rotary impact assembly 621, which transmits rotational motion to the output spindle 622, for example, as described in U.S. Patent Application Publication No. 2016/0250738, which is incorporated by reference.

A partition assembly 605 between the motor assembly 614 and the transmission assembly 618 comprises a front motor end plate 642 on a front end portion 604 of the motor assembly 614 and a rear cover 670 on a rear end of the transmission assembly 18. The rear end portion 600 of the motor assembly 614 includes a fan 640 for cooling the motor assembly 614 coupled to and rotatably driven by the motor output shaft 692. The front motor end plate 642 has a central opening 644 through which the motor output shaft 692 extends. The motor end plate 642 has a generally disk shaped body 646 with a front face portion 648 that faces toward the transmission assembly 618, and a rear face portion 650 that faces toward the remainder of the motor assembly 614. The front face portion 648 has a generally flat annular wall 654 with a first annular recess 654 located radially outward from longitudinal axis X at a first radial distance R1 and a first annular projection 656 located radially outward from the longitudinal axis X at a second radial distance R2 that is greater than the first radial distance R1. The first annular recess 654 is bounded by a first inner radial wall 658, a first outer radial wall 660, and a first annular wall 662, and has a first height H1 and a first depth D1.

The rear cover 670 covers a rear end 672 of the generally tubular wall 607 of the transmission housing 632. The cover 670 is generally disk shaped and has a central aperture 674 that receives the motor output shaft 692, a front face 674 that faces the reduction gearset 609, a rear face 676 that faces the motor assembly 614, and a peripheral edge portion 678 that couples the rear cover 670 to the transmission housing 632. The rear face 246 includes a second annular recess 680 and a second annular projection 682 extending rearward from the rear face 676. The second annular recess 680 is bounded by a second inner radial wall 684, a second outer radial wall 686, and a second annular wall 688, and has a second height H2 that is greater than the first height H1, and a second depth D2 that is greater than the first depth D1. In other embodiments, the first height H1 may be less than or equal to the second height H2 and the first depth D1 may be less than or equal to the second depth D2.

To assemble the motor assembly 614 and the transmission assembly 618, the cover 670 is non-rotationally coupled to the rear end 672 of the transmission housing 632 and the output shaft 692 of the motor assembly 614 is inserted through the central aperture 674 of the cover 670 so that a sun gear 611 meshes with planet gears 613 of the reduction gearset 609. At the same time, the first annular projection 656 on the motor end plate 642 is received in the second annular recess 680 in the cover 670, and the second annular projection 682 on the cover 670 is received in the first annular recess 654 in the motor end plate 642. A first space 655 between the second projection 682 and the walls 658, 660, 662 that bound the first annular recess 654 defines a first labyrinth path A having a first generally U-shaped undulation. A second space 657 between the first projection 656 and the walls 684, 686, 688 that bound the second annular recess 680 defines a second labyrinth path B having a second generally U-shaped undulation. Together, the first labyrinth path A and the second labyrinth path B of the partition assembly 605 reduce or inhibit migration of grease and dust contamination between the transmission housing 32 and the motor assembly 14 by trapping grease and/or dust. The multiple labyrinth path is significantly more effective in trapping the grease than is a single labyrinth path. In alternate embodiments, there may be more than two labyrinth paths. In addition, one or more of the labyrinth paths may have a different configuration such as crenellated, bustrophedonic, wave-like, S-shaped, Z-shaped, and/or sinusoidal.

Figure 15:
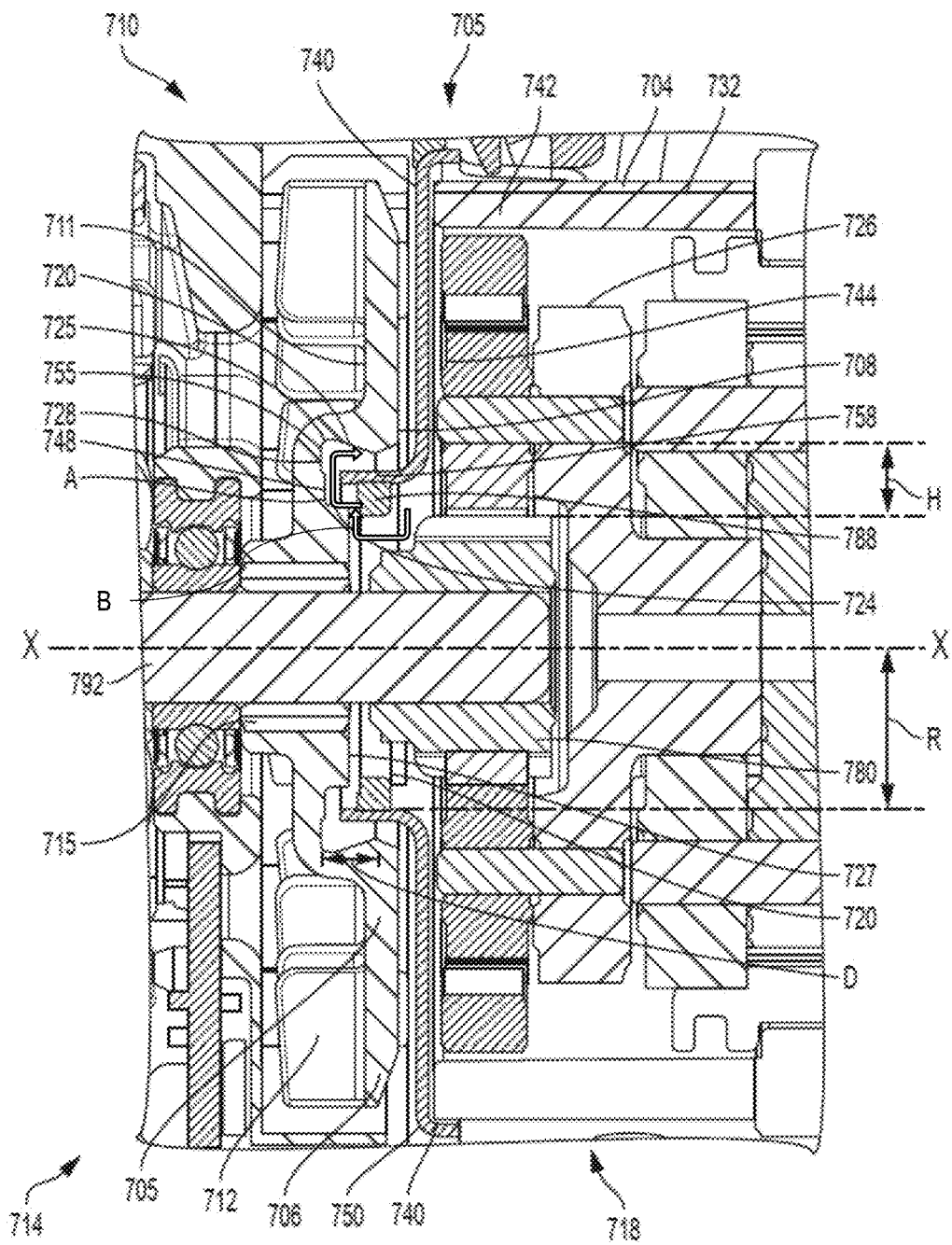
FIG. 15 is a side cross-sectional view of an alternative embodiment of a partition assembly with a seal usable with the motor assembly and transmission assembly of FIG. 3.
Figure 16A:
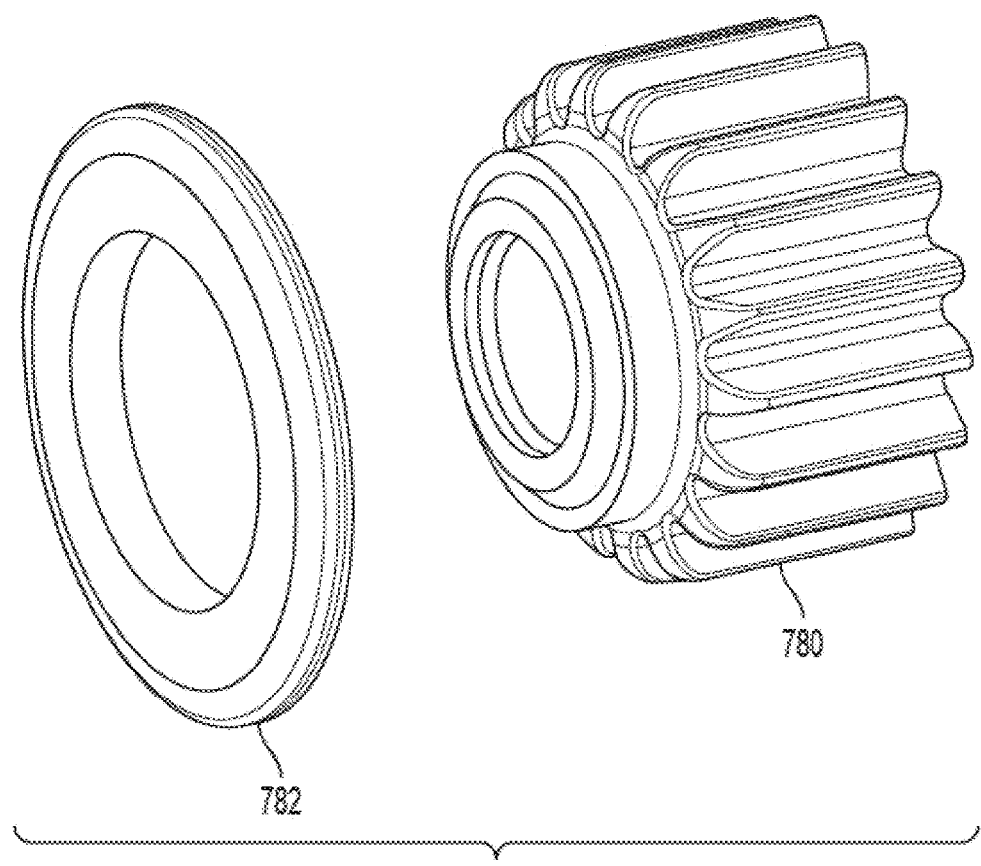
FIG. 16A is an exploded view of another alternative embodiment of a sun gear and O-ring seal of a partition assembly.
Figure 16B:
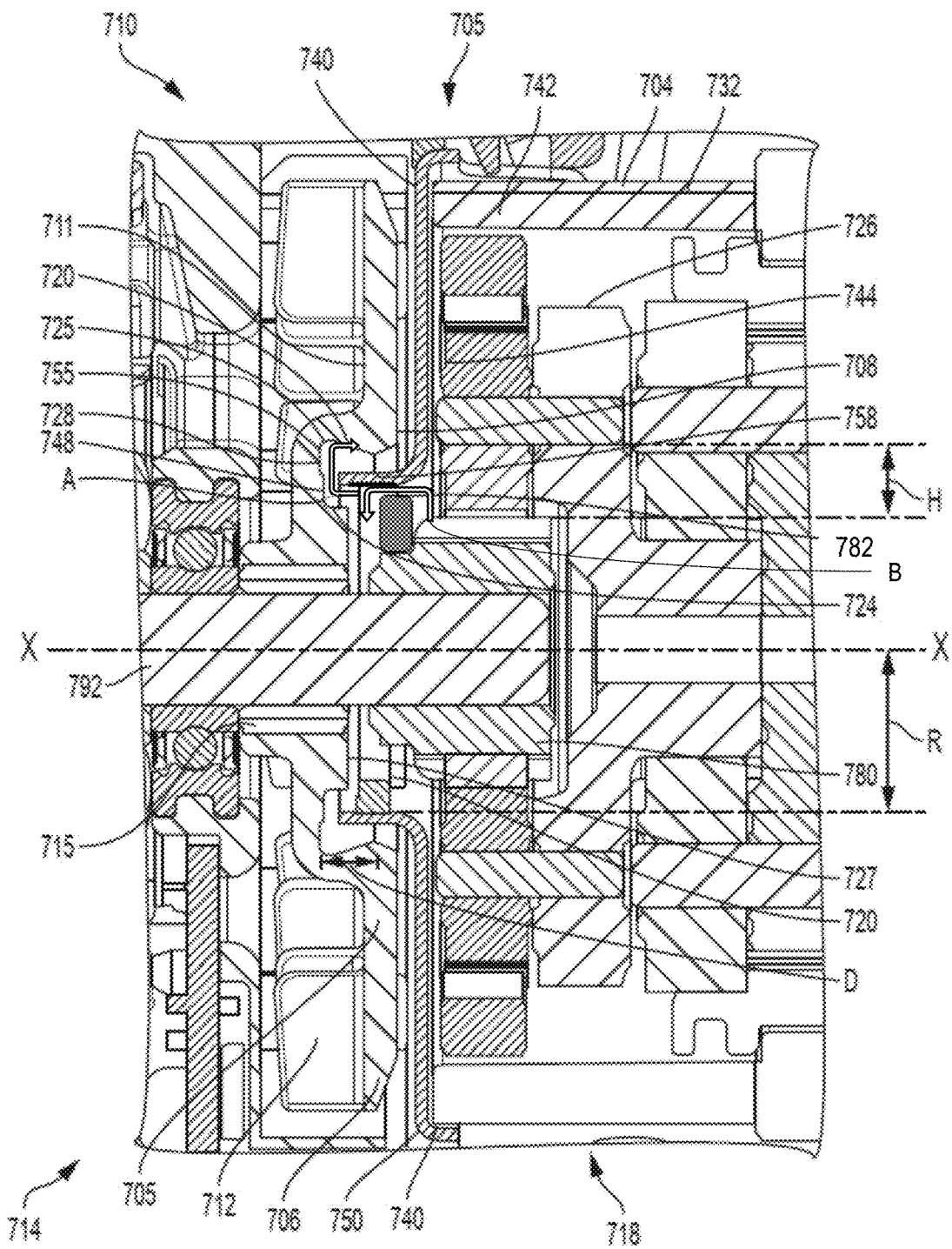
FIG. 16B is a cross-sectional view of the alternative embodiment of a partition assembly with a seal of FIG. 16A.

Referring to FIGS. 15, 16A, and 16B, in another embodiment, a power tool 710 similar to the power tool 10 may include a partition assembly 705 between a motor assembly 714 and a transmission assembly 718, similar to the motor assembly 14 and transmission assembly 18, described above. The partition assembly 705 includes a fan 706 similar to the fan 206, described above, and a one-piece or unitary cover 740 that covers the rear end 742 of a generally tubular rear portion 704 of the transmission housing 732. The fan 706 is rotatably driven by a motor output shaft 792 in order to cool the motor assembly 714. The fan 706 has a generally disk shaped body 705 with a central hub 715 that is keyed to the output shaft 792, a front face portion 708 that faces toward the transmission assembly 718, and a rear face portion 711 that faces toward the remainder of the motor assembly 714. The rear face portion 711 carries a plurality of fan blades 712 configured to blow cooling air over the motor assembly 714 when the output shaft 792 rotates. The front face portion 708 has a generally flat annular wall with an annular recess 720 located radially outward from the hub 214 at a first radial distance R from the longitudinal axis X. The annular recess 720 is bounded by an inner radial wall 724, an outer radial wall 726, and an annular wall 728, and has a height H and a depth D.

The cover 740 is generally disk shaped and has a central aperture 748 that receives a motor output shaft 792, a front face 744 that faces the reduction gearset 110, a rear face 746 that faces the fan 706, and a peripheral edge portion 750 that couples the cover 740 to the tubular rear portion 704 of the transmission housing 732. The rear face 746 includes an annular projection 758 extending rearward from the rear face 746. The annular projection 758 surrounds the central aperture 748 and is configured to be received in the annular recess 720 of the fan 704. The cover 740 is retained on the transmission housing 732 similar to one of the covers shown in FIGS. 7, 11, and 12.

A first space 755 between the projection 758 and the walls 724, 726, 728 that bound the annular recess 720 define a first labyrinth path A having a first generally U-shaped undulation to reduce or inhibit migration of grease and dust contamination between the transmission assembly 718 and the motor assembly 714 by trapping grease and/or dust. To further reduce or inhibit migration of grease and dust contamination, the radial outer wall 726 of the annular recess 720 in the fan 706 is provided with an undercut 725, while the inner hub 714 has its front face 727 trimmed back. To even further reduce or inhibit migration of grease and dust contamination, a first annular seal 782 (e.g., an elastomeric or plastic O-ring) is received on the input sun gear 780 that is driven by the motor output shaft 792 (as shown in the implementation of FIGS. 16A and 16B), and/or a second annular seal 788 (e.g., an elastomeric or plastic O-ring) is formed on an inner diameter of the annular projection 758 of the cover 740 (as shown in the implementation of FIG. 15). The first annular seal 782 defines a second generally U-shaped labyrinth path B, as shown in FIGS. 16A and 16B. The second annular seal 788 defines a third generally U-shaped labyrinth path C, as shown in FIG. 15. The partition assembly may have one or both of these seals 782, 788. Together with the first labyrinth path A, the second labyrinth path B and/or the third labyrinth path C further reduce or inhibit migration of grease and dust contamination more than the labyrinth path A by itself. These features may be combined with additional labyrinth paths, as described above.

Figure 17:
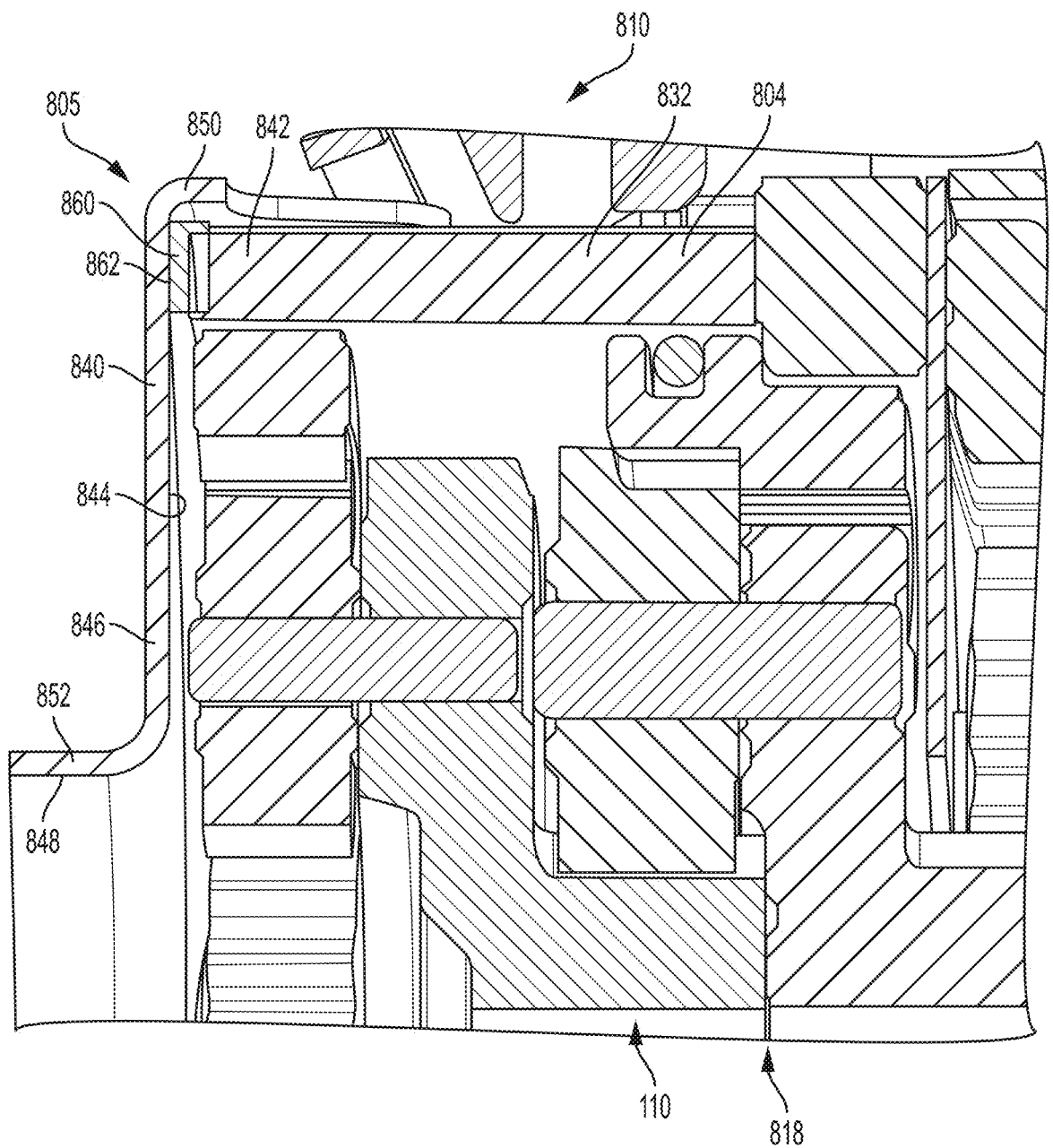
FIG. 17 is a side cross-sectional view of an alternative embodiment of a partition assembly usable with the motor assembly and transmission assembly of FIG. 3.
Figure 19:
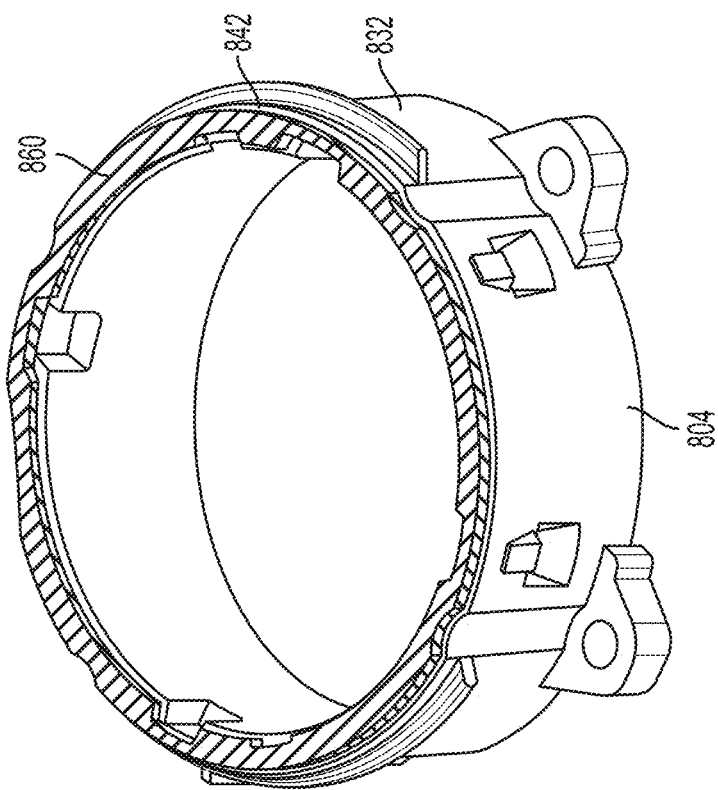
FIG. 19 is a perspective view of another embodiment of a transmission housing and a seal of the partition assembly of FIG. 17.
Figure 18:
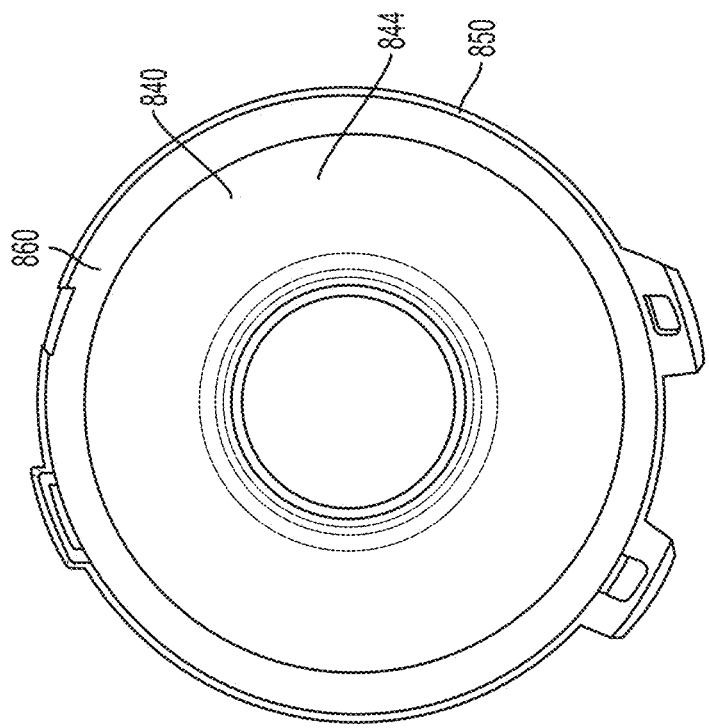
FIG. 18 is a front view of an embodiment of a cover and a seal of the partition assembly of FIG. 17.
Figure 20:
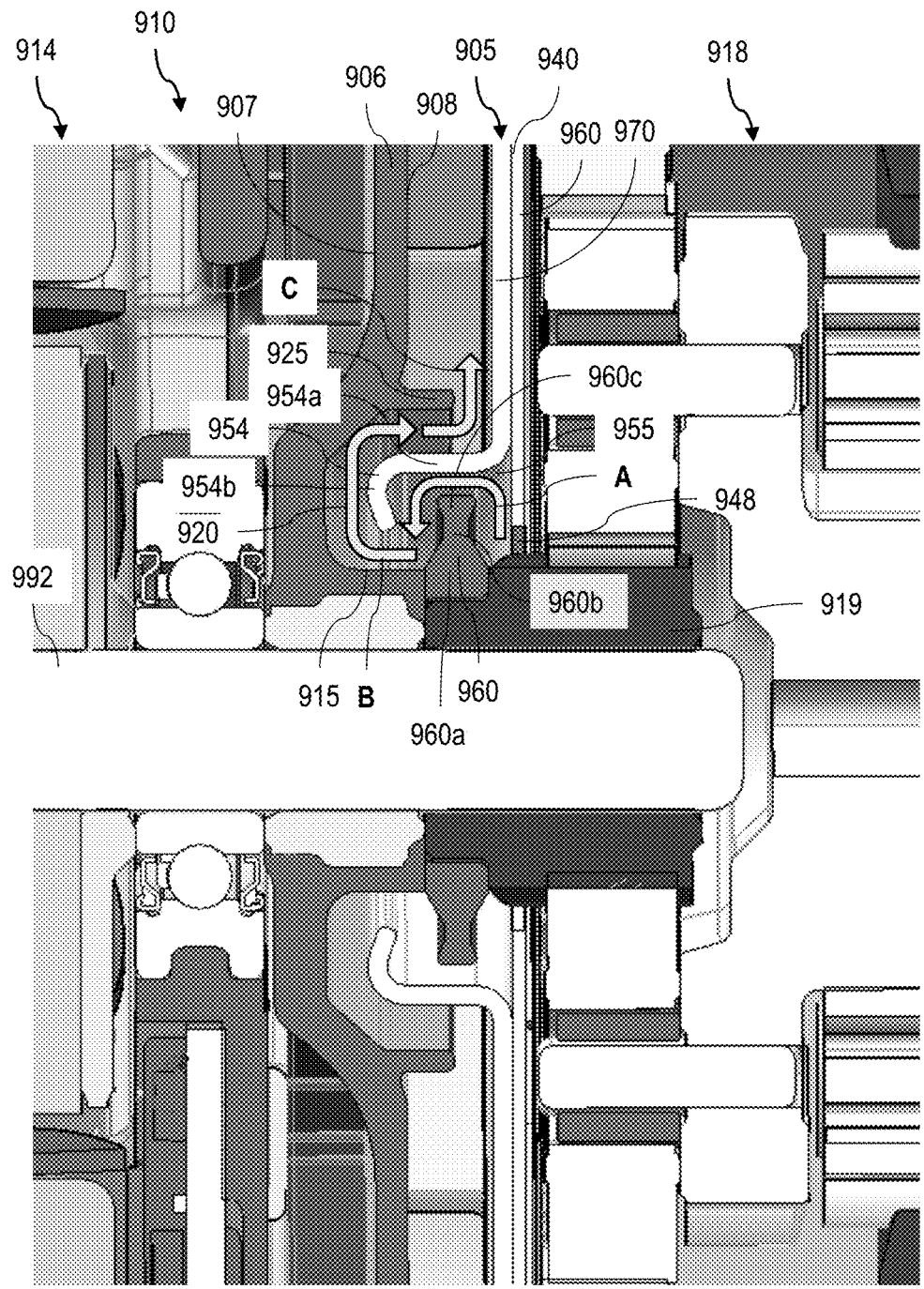
FIG. 20 is a cross-sectional view of an alternative embodiment of a partition assembly usable with the motor assembly and transmission assembly.
Figure 21B:
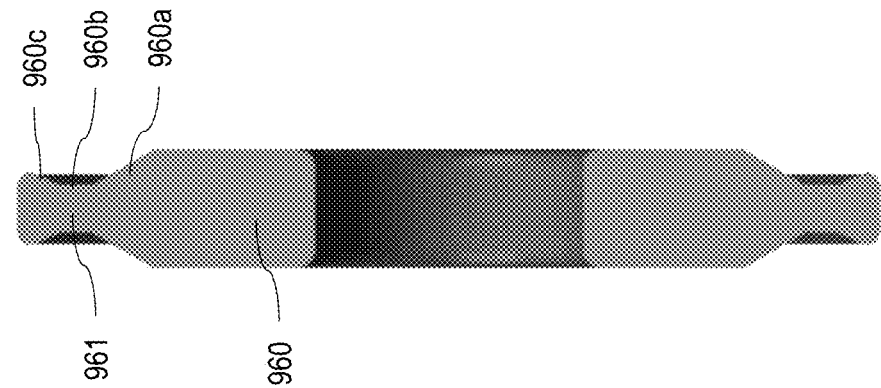
FIG. 21B is a cross-sectional view of the seal of FIG. 21A.
Figure 21A:
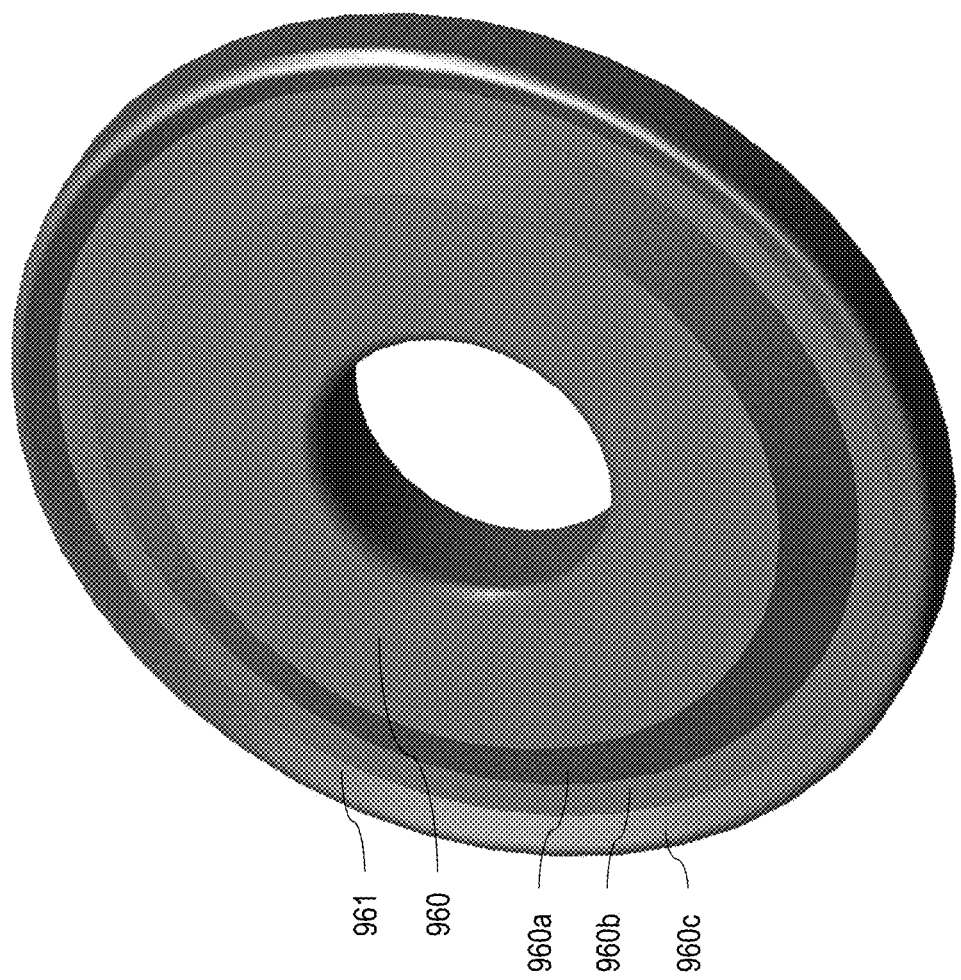
FIG. 21A is a perspective view of an embodiment of a seal usable with the partition assembly of FIG. 20.

Referring to FIGS. 17-19, in another embodiment, a power tool 810 similar to the power tool 10 may include a partition assembly 805 between a motor assembly (not shown) and a transmission assembly 818, similar to the motor assembly 14 and transmission assembly 18, described above. The partition assembly 805 includes a fan (not shown) similar to the fan 206, described above, and a one-piece or unitary cover 840 that covers the rear end 842 of a generally tubular rear portion 804 of the transmission housing 832. The cover 840 is generally disk shaped and has a central aperture 848 that receives the motor output shaft, a front face 844 that faces the reduction gearset 110, a rear face 846 that faces the fan, and a peripheral edge portion 850 that couples the cover 840 to the rear portion 842 of the transmission housing 832. The rear face 846 includes an annular projection 852 extending rearward from the rear face 846. The annular projection 852 surrounds the central aperture 848 and is configured to be received in the annular recess of the fan. The cover 840 is retained on the transmission housing 832 similar to one of the covers shown in FIGS. 7, 11, and 12.

A seal 860 is disposed between a peripheral portion 862 of the front face 844 of the cap 840 and the rear end portion 842 of the transmission housing 832. The seal 860 may be annular, ring shaped, or semi-circular, and may be formed of a metal, plastic, or elastomeric (e.g., rubber) material. As shown in FIG. 18, the seal 860 may be integrally formed (e.g., overmolded) with front face 844 of the cap 840. Alternatively, as shown in FIG. 19, the seal 860 may be integrally formed (e.g., overmolded) with the rear end portion 842 of the transmission housing 832. In other embodiments, the seal 860 may not be integrally formed with either the transmission housing 832 or the cap 840, and may instead be sandwiched between them. The seal 860 is configured to reduce or inhibit migration of grease and dust contamination between the transmission assembly 810 and the motor assembly. The seal 860 may be combined with one or more of the multiple labyrinth paths, as shown in FIGS. 3-8, and/or the features of FIGS. 15-16 to further reduce or inhibit migration of grease and dust contamination between the transmission assembly and the motor assembly.

Referring to FIGS. 20-22C, in another embodiment, a power tool 910 similar to the power tool 10 may include a partition assembly 905 between a motor assembly 914 and a transmission assembly 918, similar to the motor assembly 14 and transmission assembly 18, described above. The partition assembly 905 includes a fan 906 similar to the fan 206, described above, and a two-piece cover 940 similar to rear covers 240 and 740 described above, that covers the rear end of the transmission assembly 918. The fan 906 is rotatably driven by a motor output shaft 992 in order to cool the motor assembly 914. The fan 906 has a generally disk shaped body with a central hub 915 that is keyed to the output shaft 992, a rear face 907 that faces the motor assembly 914, and a front face 908 that faces toward the transmission assembly 918. The front face 908 has an intermediate annular wall 925 that extends axially forward from the front face portion 908 proximate the hub 915 with an annular recess 920 defined between the hub 915 and the intermediate annular wall 925.

The rear cover 940 is formed in two parts that comprise a first or front cover plate 960 and a second or rear cover plate 970. The first cover plate 960 is generally disk shaped with a first central aperture 948 that receives a sun gear 919 of the transmission assembly 918 that is coupled for rotation with the output shaft 992 of the motor assembly 914. The second cover plate 970 is generally disk-shaped with an L-shaped or J-shaped annular projection 954 on its inner periphery surrounding a second central aperture 949 that receives the central hub 915 of the fan 906. The annular projection 954 includes a first portion 954a that extends axially rearward substantially perpendicular to the second cover plate 970 and a second portion 954b that extends axially forward and radially inward from the first portion 955. The annular projection 954 is received in the annular recess 920 of the fan 906 between the hub 915 and the intermediate annular wall 925. In the illustrated embodiment, the rear cover 940 is composed of separate first and second cover plates 960, 970 as it is less costly to manufacture the plates individually out of individual pieces of sheet metal. However, as described above, in other embodiments, the rear cover 940 may be formed of a single integral piece of material. Also, the cover plates 960, 970 may be affixed to one another, e.g., by threaded fasteners, welding, or adhesive. The rear cover 940 may be retained on the transmission housing similar to one of the rear covers shown in FIGS. 7, 11, and 12. In addition, the cover 940 may be attached to the transmission housing by other types of connections such as by a bayonet-type connection, by threaded fasteners, by being welded, or by using an adhesive.

An annular seal 960 is disposed on the rear end of the sun gear 929 and received in a space 955 between the front cover plate 970 and the L-shaped or J-shaped annular projection 954 on the rear plate 970. The seal 960 may be annular, ring shaped, or semi-circular, and may be formed of a metal, plastic, or elastomeric (e.g., rubber) material. The seal 960 may have an outer portion 961 with an hourglass or dovetail shaped cross-section with an inwardly tapered base portion 960a coupled to the sun gear 929, a straight and narrow waist portion 960b radially outward from the base portion 960a, and an outwardly tapered top portion 960c radially outward from the waist portion 960b. As shown in FIGS. 22A-22C, the narrow waist portion 960b enables the seal 960 to flex as the tool is being assembled with the transmission assembly moving along arrow X toward the motor assembly.

A first labyrinth path A with a generally U-shaped undulation is defined in the space 955 between the seal 960, the front cover plate 960 and the annular projection 954 on the rear cover plate 970. A second labyrinth path B with a generally U-shaped undulation is defined in the recess 954 between the annular projection 954 on the rear cover plate 970, front face 908 of the fan 906, the hub 915 of the fan 906, and the intermediate annular wall 925 of the fan 906. A third labyrinth path C with a generally L-shaped or U-shaped undulation is defined between the intermediate annular wall 925 of the fan 906, the annular projection 954 on the rear cover plate 970, and the rear face of the rear cover plate 970. Separately and together, the labyrinth paths A, B, and C reduce or inhibit migration of grease and dust contamination between the transmission assembly 918 and the motor assembly 914. In addition, as shown in FIG. 23C, a pocket 953 defined in the bend of the L-shaped or J-shaped annular projection 954 on the rear cover plate 970 may facilitate trapping dust and/or grease.

Figures 23A, 23B:
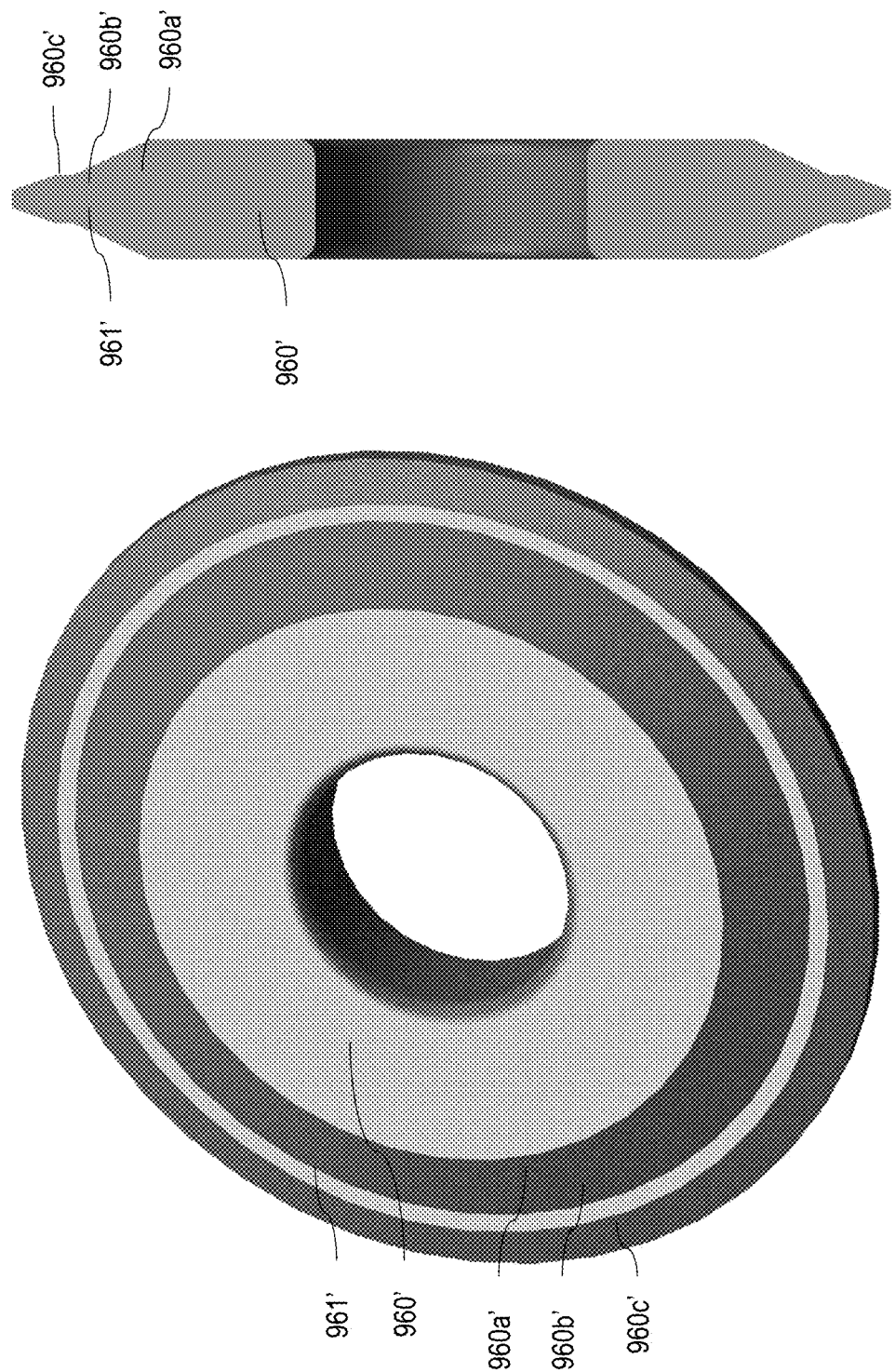
FIG. 23A is a perspective view of another embodiment of a seal usable with the partition assembly of FIG. 20.
FIG. 23B is a cross-sectional view of the seal of FIG. 23A.

Referring also to FIGS. 23A and 23B, in an alternative embodiment, a seal 960', similar to seal 960, is disposed on the rear end of the sun gear 929 and may have an arrowhead shaped cross section with an inwardly tapered base portion 960a', a straight intermediated portion 960b' extending radially outward from the base portion 960b', and an inwardly tapered top portion 960c' extending radially outward from the intermediate portion 960b', with the cross section of the seal 960' getting narrower as it extends radially outward. The seal 960' may flex at the intermediate portion 960b' as the tool is being assembled with the transmission assembly moving along arrow X toward the motor assembly. In other embodiments, the seal may have other cross-sectional shapes that allow it to flex during assembly. In yet other embodiments, the seal may have another cross-sectional shape that does not enable it to flex during assembly.

Figure 24:
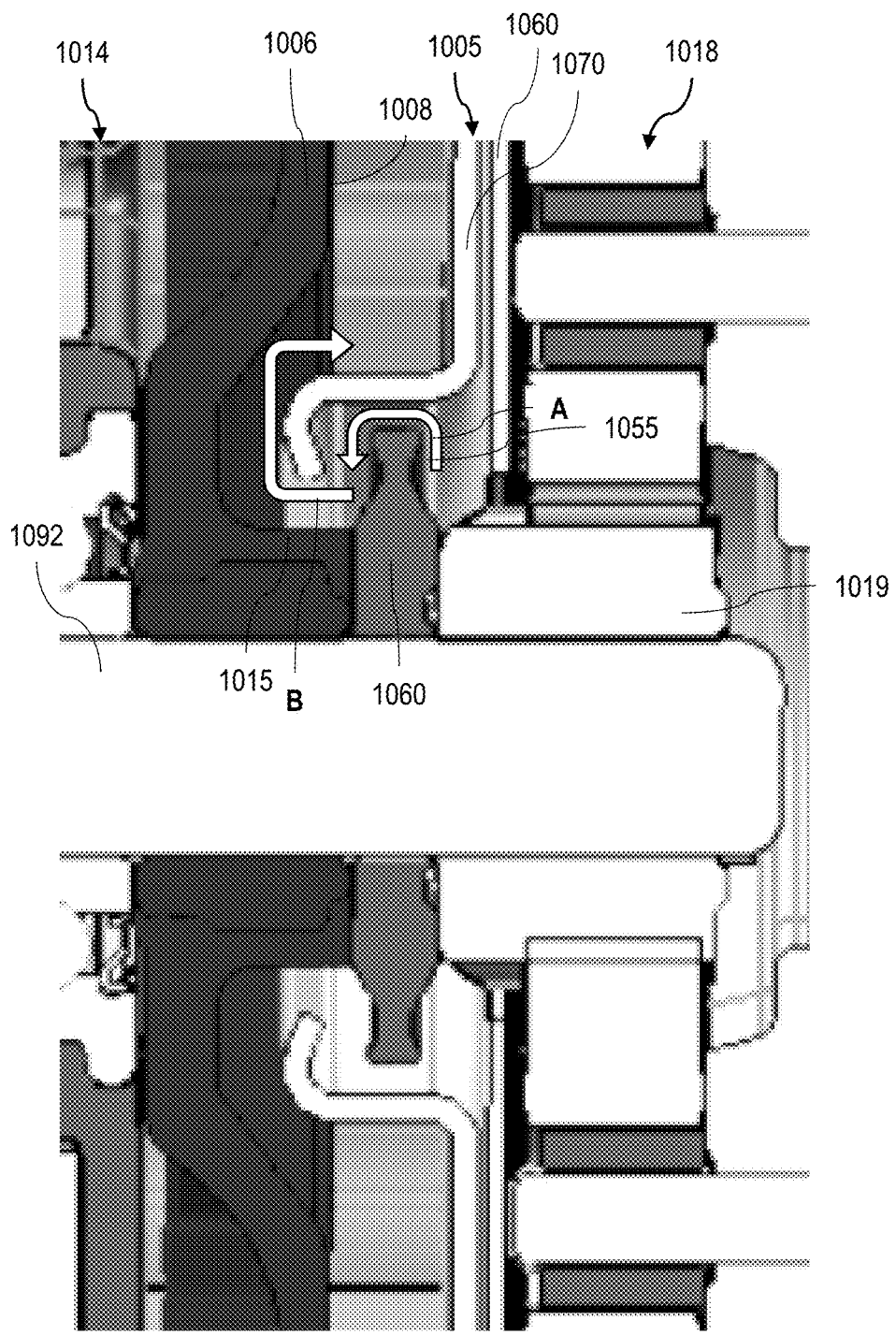
FIG. 24 is a cross-sectional view of an alternative embodiment of a partition assembly usable with the motor assembly and transmission assembly.

Referring to FIG. 24, in another alternative embodiment, a partition assembly 1005 between a transmission assembly 1018 and a motor assembly 1014 includes a front cover plate 1060 and a rear cover plate 1070 that are substantially similar to the partition assembly 905 between the transmission assembly 918 and motor assembly 914 described above. The partition assembly 1005 further includes a seal 1060 having the same configuration and cross-sectional shape as seal 960. The seal 1060 differs from the seal 960 insofar as the seal 1060 is disposed on the motor output shaft 1092 between the hub 1015 of the fan 1006 and the sun gear 1019 of the transmission assembly 1018. Like the seal 960, the seal 1060 can flex as it is assembled into the tool. The seal 1060 also defines a first labyrinth path A with a generally U-shaped undulation in the space 1055 between the seal 1060, the front cover plate 1060 and the annular projection 1054 on the rear cover plate 1070. Also, like the partition assembly 905, a second labyrinth path B with a generally U-shaped undulation is defined in the recess 1054 between the annular projection 1054 on the rear cover plate 1070, the front face 1008 of the fan 1005, and the hub 1015 of the fan 1005. Separately and together, the labyrinth paths A and B reduce or inhibit migration of grease and dust contamination between the transmission assembly 1018 and the motor assembly 1014. In this implementation, the seal could also have a cross-sectional shape like the seal 960' described above or another cross-sectional shape that enable it to flex during assembly, or yet another cross-sectional shape that does not enable it to flex during assembly.

Figure 25:
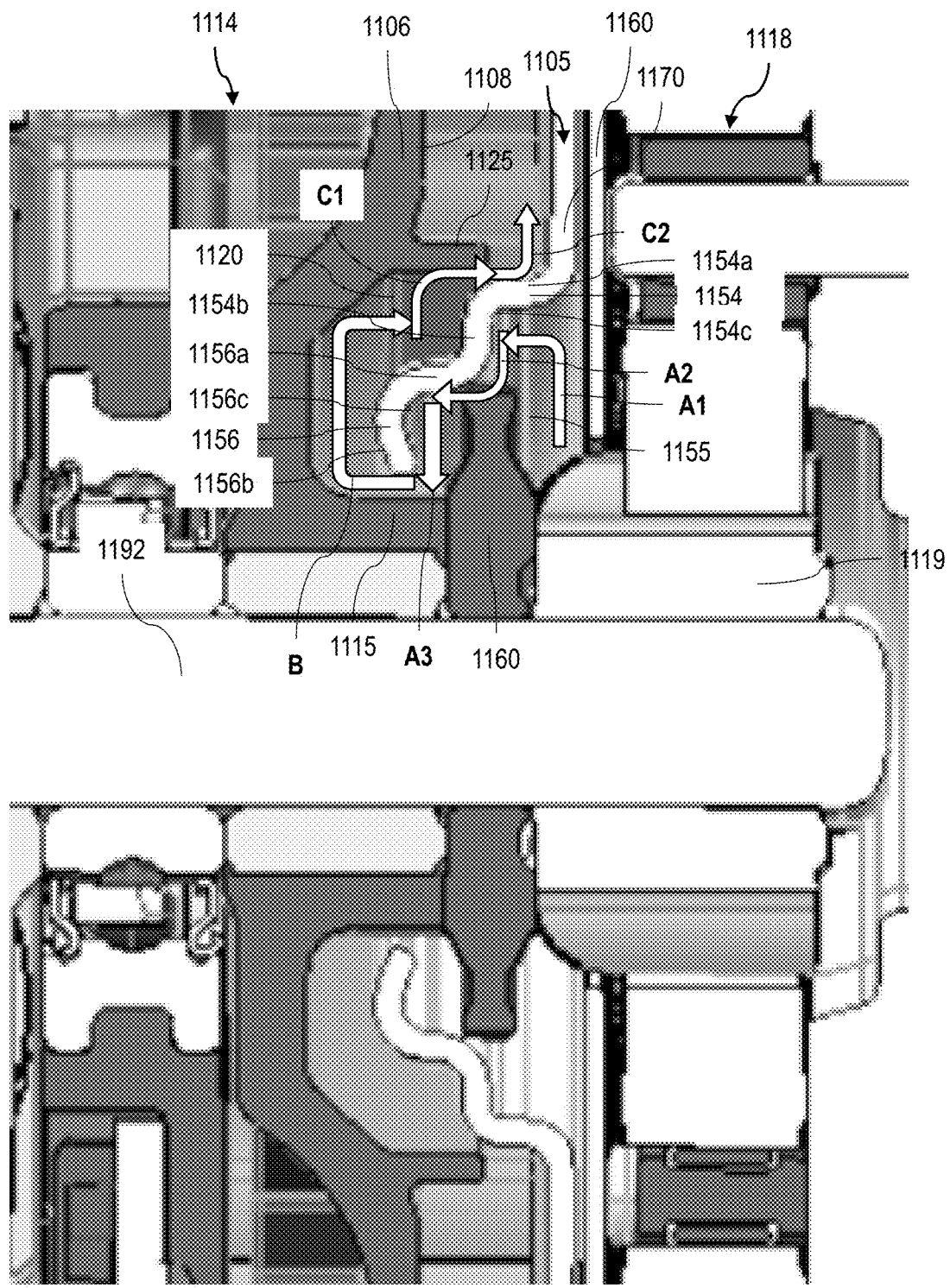
FIG. 25 is a cross-sectional view of an alternative embodiment of a partition assembly usable with the motor assembly and transmission assembly.

Referring to FIG. 25, in another alternative embodiment, a partition assembly 1105 between a transmission assembly 1118 and a motor assembly 1114 includes a front cover plate 1160, a rear cover plate 1170, and a seal 1160 that are substantially similar to the partition assembly 1005 between the transmission assembly 1018 and motor assembly 1014 described above. The partition assembly 1105 differs from the partition assembly 1005 insofar as the rear cover plate 1170 includes two or more an L-shaped or J-shaped annular projections 1154, 1156 on its inner periphery surrounding a second central aperture 1149 that receives the central hub 1115 of the fan 1106. The first annular L-shaped or J-shaped projection 1154 includes a first portion 1154a that extends axially rearward substantially perpendicular to the second cover plate 1170 and a second portion 1154b that extends radially inward from the first portion 1154a with a first pocket 1154c defined at a junction between the first portion 1154*a* and the second portion 1154*b*. The second annular L-shaped or J-shaped projection 1156 includes a first portion 1156*a* that extends axially rearward substantially perpendicular to the second portion 1154*b* of the first projection 1154 and a second portion 1156*b* that extends radially inward and axially forward from the first portion 1156*a*, with a second pocket 1156*c* defined at a junction between the first portion 1156*a* and the second portion 1156*b*. The first and second projections 1154, 1156 are received in an annular recess 1120 of the fan 1106 between its hub 1115 and its intermediate annular wall 1125.

A first labyrinth path indicated by arrows A1, A2, A3 is defined in the space 1155 between the seal 1160, the front cover plate 1160 and the annular projections 1154, 1156 on the rear cover plate 1170. The first labyrinth path A1, A2, A3 is generally U-shaped with an inward jog at one corner of the U-shape as indicated by arrow A2. A second labyrinth path B with a generally U-shaped undulation is defined in the recess 1154 between the second annular projection 1156 on the rear cover plate 1170, the front face 1108 of the fan 1106, the hub 1115 of the fan 1106, and the intermediate annular wall 1125 of the fan 1106. A third labyrinth path, indicated by arrows C1 and C2, has a generally S-shaped or Z-shaped undulation defined between the intermediate annular wall 1125 of the fan 1106, the first annular projection 1154 on the rear cover plate 1170, and the rear face of the rear cover plate 1170. Separately and together, the first, second, and third labyrinth paths A, B, and C reduce or inhibit migration of grease and dust contamination between the transmission assembly 918 and the motor assembly 914. In addition, as shown in FIG. 23C, first and second pockets 1154*c*, 1156*c* defined in the bends of the L-shaped or J-shaped annular projections 1154, 1156 on the rear cover plate 1170 may facilitate trapping dust and/or grease.

Figure 26:
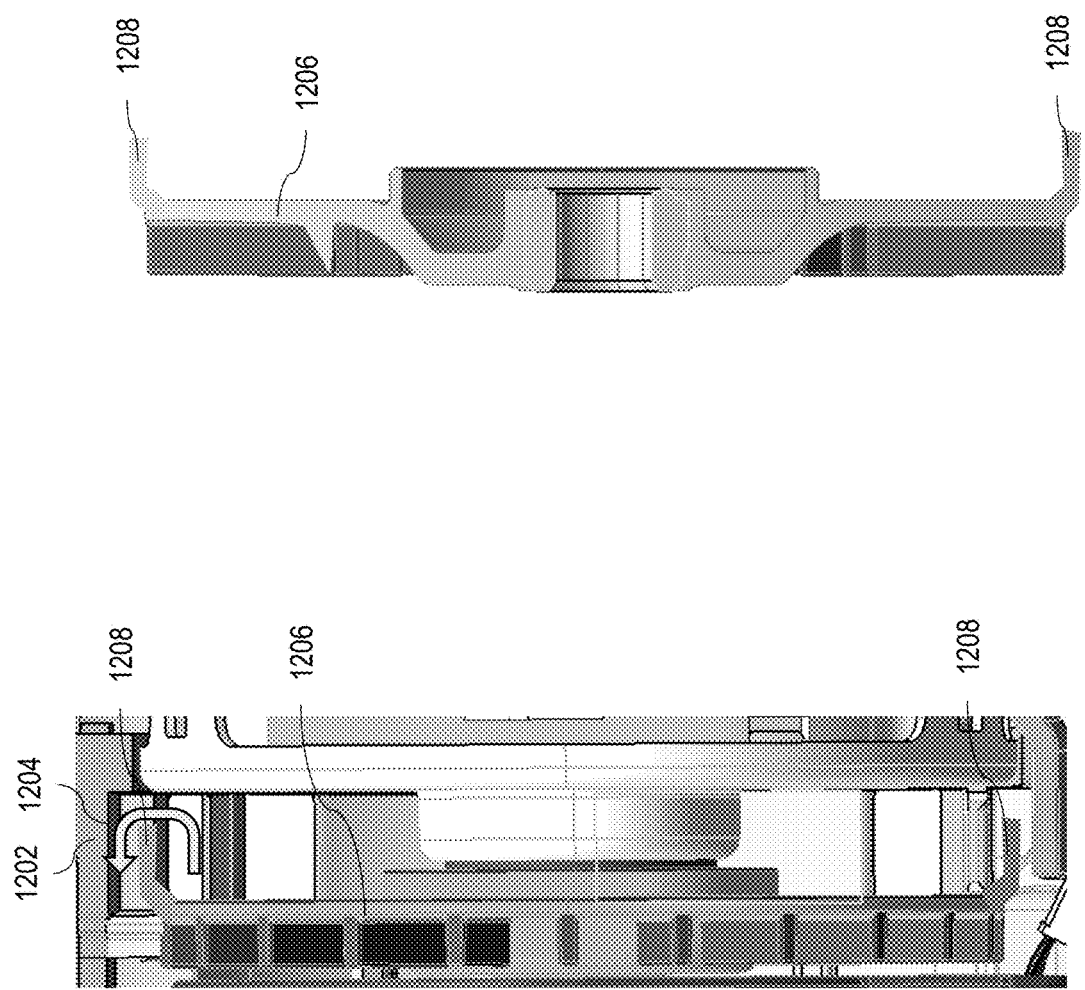
FIGS. 26A and 26B are cross-sectional views of a motor fan usable with any of the foregoing embodiments of a partition assembly.
Figure 27:
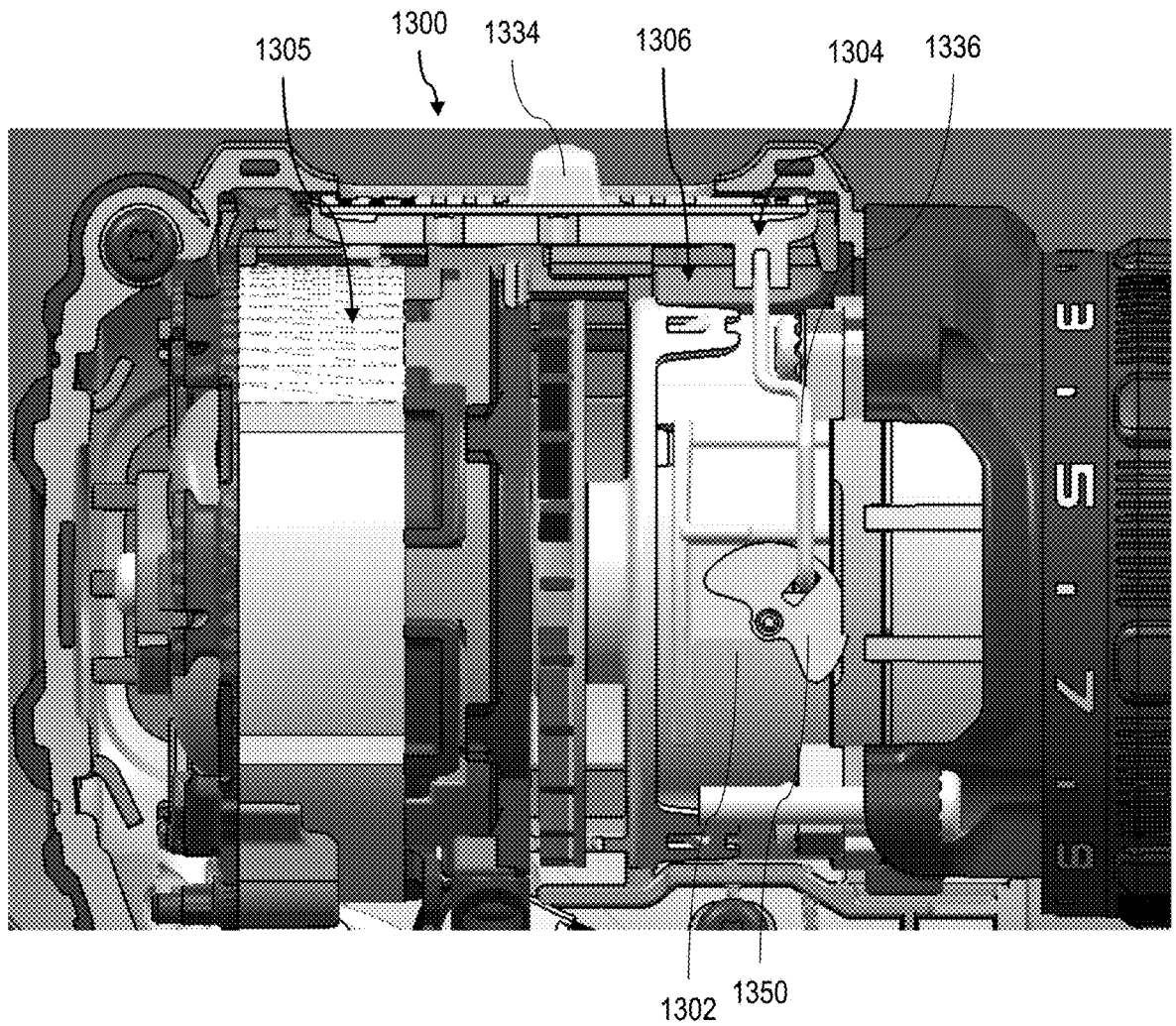
FIG. 27 is a side view of a portion of an embodiment of a power tool with a cover on a shift mechanism of a transmission assembly.
Figure 28A:
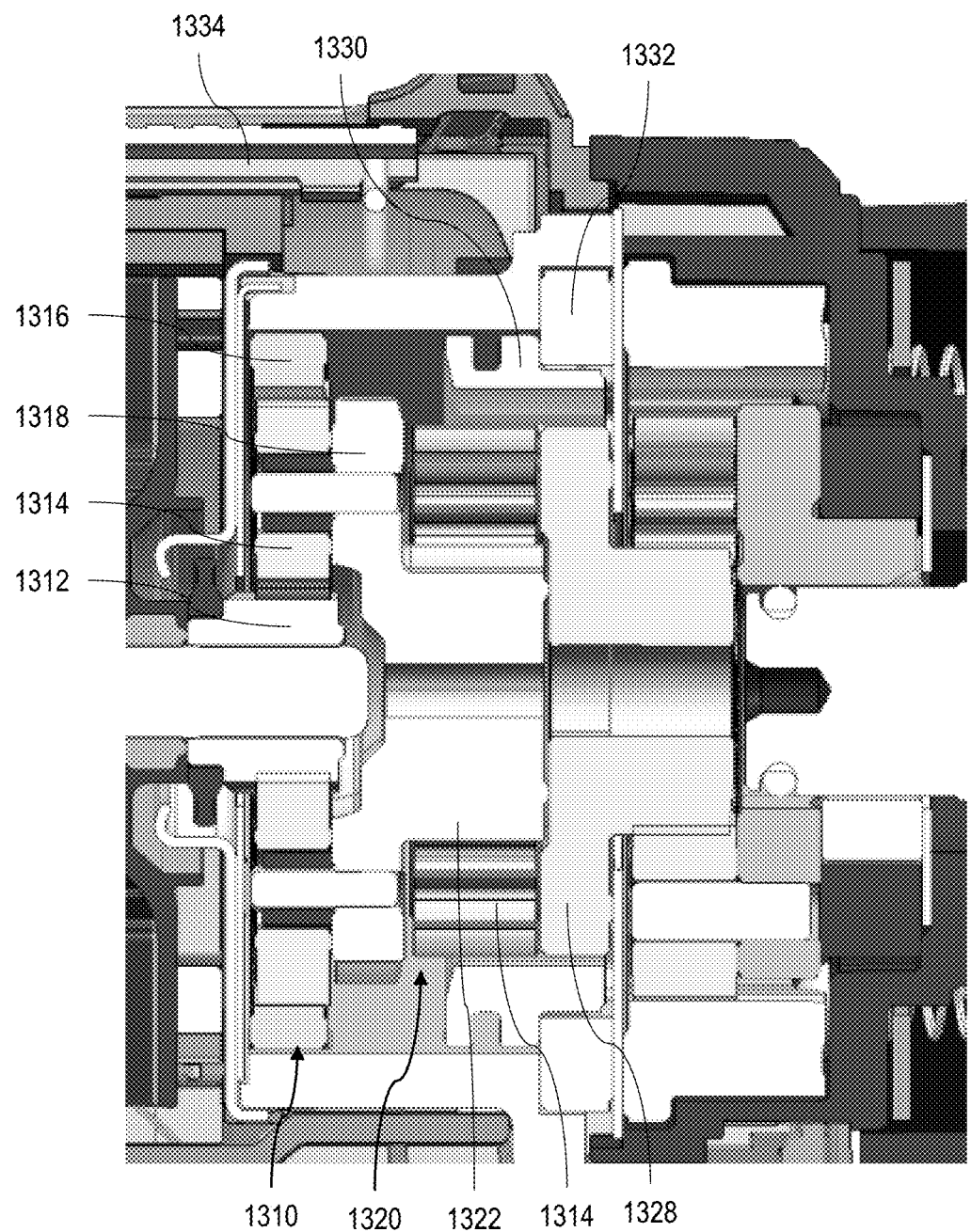
FIGS. 28A and 28B are cross-sectional views of the transmission assembly of FIG. 27 showing forward and rearward positions of the shift mechanism, respectively.
Figure 28B:
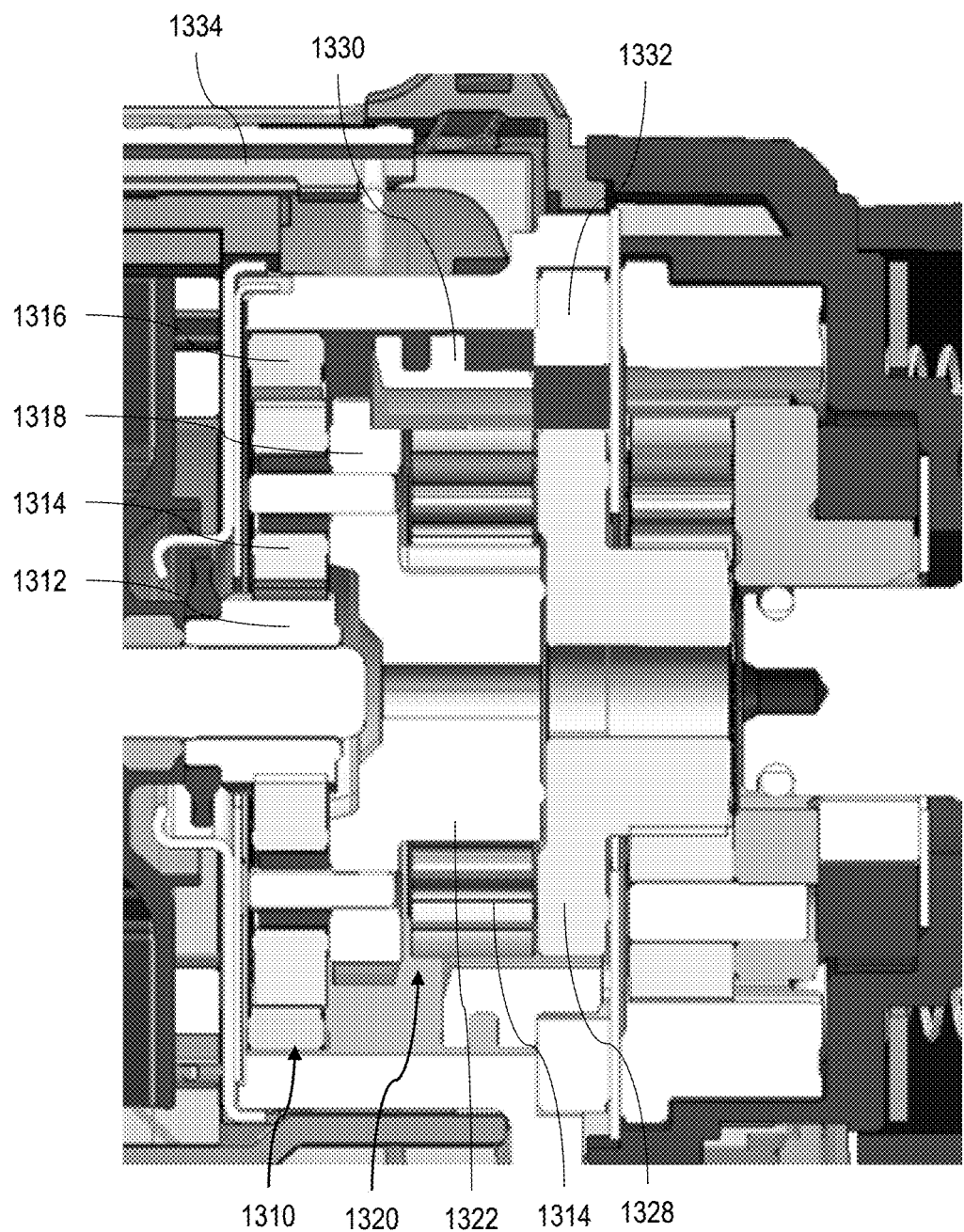
Figure 29A:
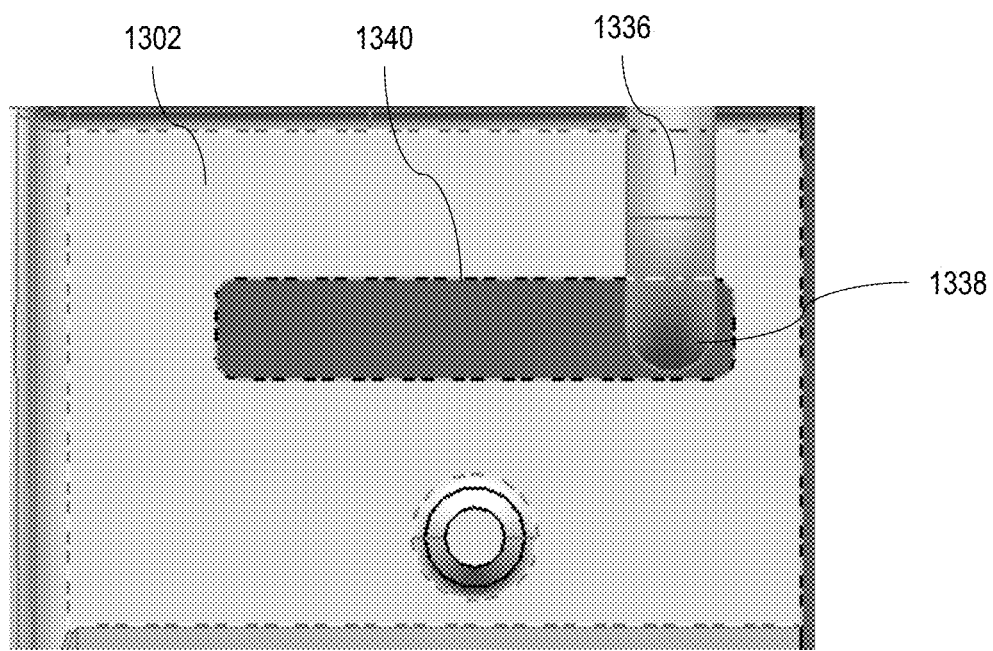
FIG. 29A is a close-up side view of the transmission housing and shift wire of FIG. 27.
Figure 29B:
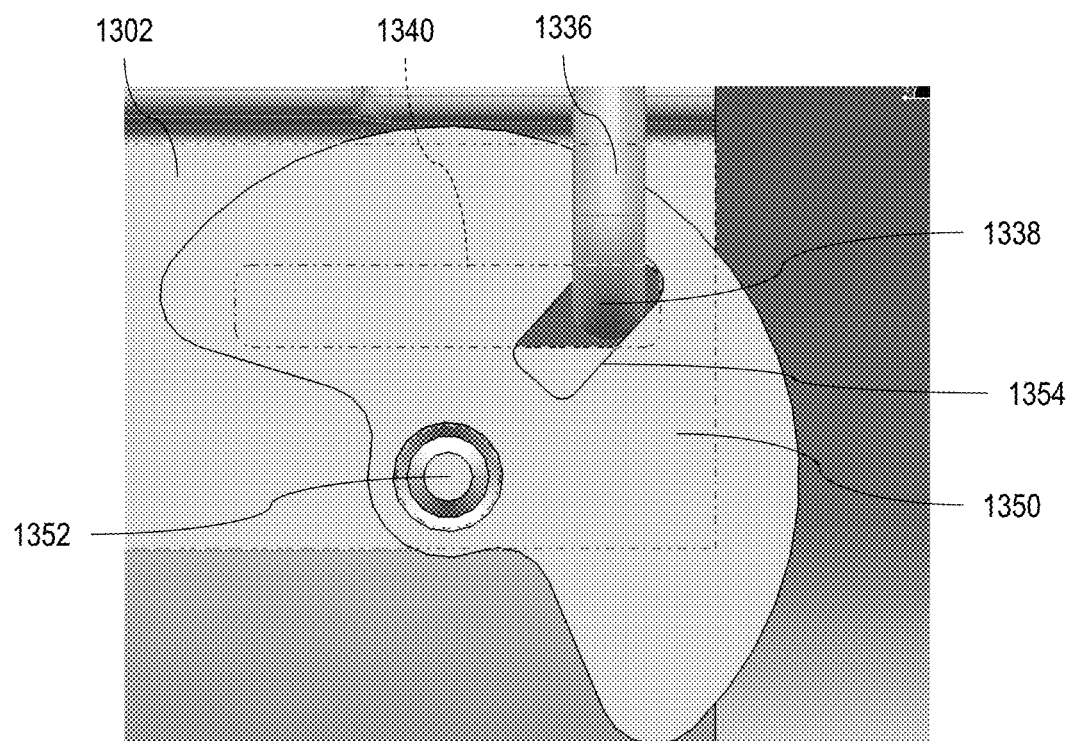
FIG. 29B is a close-up side view of the transmission housing, shift wire, and cover of FIG. 27.

Referring to FIGS. 26A and 26B, in another embodiment, a fan 1206 disposed between a motor assembly 1214 and a transmission assembly may include a forwardly projecting lip 1208 on its outer periphery adjacent an inner wall 1204 of a motor housing 1202 and adjacent a partition assembly 1205 that is similar to one or more of the aforementioned partition assemblies. Together with the inner wall 1204 of the motor housing 1202 and the partition assembly 1205, the lip 1208 may define another labyrinth path D that is generally U-shaped to reduce or inhibit migration of grease and dust contamination between the transmission assembly 1218 and the motor assembly 1214.

Referring to FIGS. 27-30B, in another embodiment, a power tool 1300 includes a cover 1350 configured to inhibit migration of grease and dust contamination through a speed changing mechanism 1304 in a transmission assembly 1306 and to a motor assembly 1305. The transmission assembly 1306 includes a two or more speed transmission 1308 that is housed inside the transmission housing 1302. In the illustrated embodiment, the transmission 1308 includes a two or more stage planetary transmission that comprises at least a first stage 1310 and a second stage 1320. The first stage 1310 includes a first input sun gear 1312, a plurality of first planetary gears 1314 that mesh with the first sun gear 1312, a first ring gear 1316 with internal teeth that mesh with the planetary gears 1314 and that is fixed relative to the transmission housing 1302, and a first carrier 1318 to which the first planetary gears 1314 are rotationally mounted. The second stage 1320 includes a second input sun gear 1322 non-rotationally fixed to the first carrier 1318, a plurality of second planetary gears 1324 that mesh with the second sun gear 1322, and a second carrier 1328 to which the second planetary gears 1324 are rotationally mounted.

A shift ring 1330 has internal teeth that are engageable with the second planetary gears 1324 and external teeth that are engageable with a spline ring 1332, which is fixed relative to the transmission housing 1302. The shift ring 1330 is axially movable between a frontward position (shown in FIG. 28A) corresponding to a low speed mode of operation and a rearward position (shown in FIG. 28B) corresponding to a high speed mode of operation. In the frontward position, the internal teeth of the shift ring 1330 engage the second planetary gears 1324 and the external teeth on the shift ring 1330 are engaged with the stationary spline ring 1332, so that the shift ring 1330 does not rotate relative to the transmission housing 1302. In this position, there is a gear reduction through both the first stage 1310 and the second stage 1320 of the transmission 1308, for a larger overall gear reduction ratio and a slower overall output speed. In the rearward position, the internal teeth of the shift ring 1330 engage the second planetary gears 1324 and the first carrier 1318, while the external teeth of the shift ring 1330 are disengaged from the spline ring 1332, allowing the shift ring 1330 to rotate relative to the transmission housing 1302. In this position, there is a gear reduction through the first stage 1310, but not through the second stage 1320, of the transmission 1308, for a lower overall gear reduction ratio and a faster overall output speed. The shift ring 1330 is shiftable between its forward and rearward position via a user actuatable shift switch 1334 at least partially exposed from the tool housing. The shift switch 1334 is moveable axially relative to the tool housing and is coupled to the shift ring 1330 via a shift wire 1336. The shift wire 1336 at least partially surrounds the transmission housing 1302 and is coupled to the shift ring 1330 via a leg 1338 that extends through an axial slot 1340 in the transmission housing 1302.

Figures 30A, 30B:
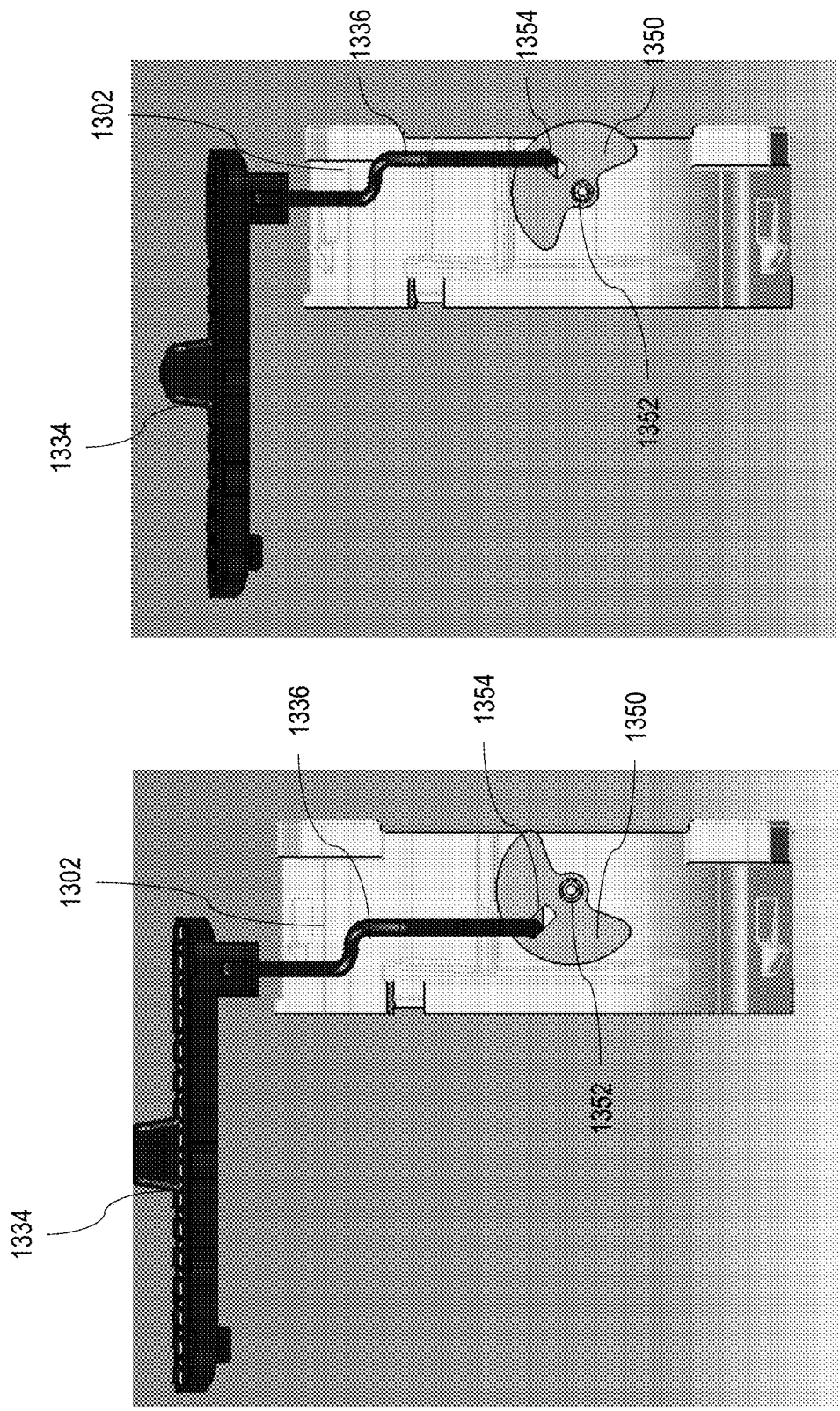
FIGS. 30A and 30B are side views of the transmission housing, shift mechanism, and cover of FIG. 27, showing rearward and forward positions of the shift mechanism, respectively.

In order to inhibit or reduce migration of grease and dust contamination to and from the transmission assembly 1306 via the slot 1340 in the transmission housing 1302, a cover 1350 is coupled to the transmission housing 1302. The cover 1350 may be at least partially sector-shaped and may be pivotally coupled to an exterior of the transmission housing 1302 by a pivot pin 1352. The cover 1350 may also include an opening 1354 that receives the leg 1338 of the shift wire 1336. The opening 1354 at least partially overlaps and is transverse to the slot 1340 in the transmission housing 1302. As the shift switch 1334 and the shift wire 1336 are moved axially between a forward position (as shown in FIG. 30A), which corresponds to the forward position of the shift ring 1330, and a rearward position (as shown in FIG. 30B), which corresponds to the rearward position of the shift ring 1330, the cover 1350 pivots about the pivot pin 1352. Thus, the cover blocks most of the slot 1340 in the transmission housing, reducing or inhibiting migration of grease and dust contamination through the slot in the transmission housing.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of the following claims.

What is claimed is:

1. A power tool comprising:
a housing;
a motor assembly received in the housing having a rear end portion, a front end portion, and a motor output shaft;
a transmission assembly received in the housing to which the motor output shaft is drivingly coupled; and
a partition assembly including a rear cover covering a rear end portion of the transmission assembly that faces the front end portion of the motor assembly with a central opening that receives the motor output shaft and a seal received in the central opening,
wherein at least one of the rear cover and the front end portion of the motor assembly define a first labyrinth path therebetween and the seal defining a second labyrinth path in the central opening, the first and second labyrinth paths configured to inhibit grease or debris migration between the transmission assembly and the motor assembly,
wherein the rear cover includes a rearward projection and the motor assembly includes a recess that receives the rearward projection, with the first labyrinth path defined by the rearward projection and the recess,
wherein the rearward projection comprises at least one of an L-shaped and a J-shaped projection having a first portion that extends axially rearward from the rear cover and a second portion that extends radially inward from the first portion.

2. The power tool of claim 1, wherein the first labyrinth path is generally U-shaped.

3. The power tool of claim 2, wherein the second labyrinth path is generally U-shaped.

4. The power tool of claim 1, wherein the seal is disposed on an inner surface of the rearward projection.

5. The power tool of claim 1, wherein the seal is disposed on one of the motor output shaft and a gear coupled to the motor output shaft.

6. The power tool of claim 5, wherein the seal includes a portion of narrow width that allows the seal to flex as the power tool is assembled.

7. The power tool of claim 6, wherein the seal has an hourglass cross-sectional shape.

8. The power tool of claim 6, wherein the seal has an arrowhead cross-sectional shape.

9. The power tool of claim 1, further comprising a pocket defined at a junction between the first portion and the second portion, the pocket configured to retain grease or debris therein.

10. The power tool of claim 1, wherein the rearward projection is a cover further comprises at least one of a second L-shaped and second J-shaped rearward projection coupled to the rearward projection, the second rearward projection having a third portion extending axially rearward from the second portion and a fourth portion extending radially inward from the third portion.

11. The power tool of claim 10, further comprising a second pocket defined at a junction between the third portion and the fourth portion, the second pocket configured to retain grease or debris therein.

12. The power tool of claim 1, wherein a third labyrinth path is defined by a second projection on one of the rear cover and the front end portion of the transmission housing to further inhibit grease or dust migration between the transmission housing and the motor assembly, the second projection received in the second recess.

13. A power tool comprising:
a housing;
a motor assembly received in the housing having a rear end portion, a front end portion, and a motor output shaft;
a transmission assembly received in the housing to which the motor output shaft is drivingly coupled; and
a partition assembly including a rear cover covering a rear end portion of the transmission assembly that faces the front end portion of the motor assembly with a central opening that receives the motor output shaft and a seal received in the central opening, wherein at least one of the rear cover and the front end portion of the motor assembly define a first labyrinth path therebetween and the seal defining a second labyrinth path in the central opening, the first and second labyrinth paths configured to inhibit grease or debris migration between the transmission assembly and the motor assembly, wherein the rear cover includes a rearward projection and the motor assembly includes a recess that receives the rearward projection, with the first labyrinth path defined by the rearward projection and the recess, wherein the front end portion of the motor comprises a fan that includes a recess that receives the projection and a lip on its outer periphery that defines a third labyrinth path configured to inhibit grease or debris migration between the transmission assembly and the motor assembly.

14. The power tool of claim 13, wherein the transmission assembly comprises a transmission housing, a multi-speed transmission disposed in the transmission housing, a shifter extending through a slot in the transmission housing, and a transmission housing cover configured to at least partially cover the slot as the shifter moves relative to the slot to change a gear ratio of the transmission.

15. The power tool of claim 13, wherein the seal is disposed on an inner surface of the rearward projection, on the motor output shaft, or on a gear coupled to the motor output shaft.

16. The power tool of claim 13, wherein the seal includes a portion of narrow width that allows the seal to flex as the power tool is assembled.

17. A power tool comprising:
a housing;
a motor assembly received in the housing having a rear end portion, a front end portion, and a motor output shaft;
a transmission assembly received in the housing to which the motor output shaft is drivingly coupled;
a partition assembly including a rear cover covering a rear end portion of the transmission assembly that faces the front end portion of the motor assembly with a central opening that receives the motor output shaft and a seal received in the central opening and coupled to at least one of the motor output shaft and a transmission assembly component coupled to the motor output shaft, wherein the rear cover includes a rearward projection with a first portion that extends axially rearward from an inner periphery of the rear cover and a second portion that extends radially inward from the first portion, and wherein the seal includes a portion of narrow width that allows the seal to flex as the seal is moved axially relative to the second portion of the rearward projection during assembly of the power tool.

18. The power tool of claim 17, wherein the seal has at least one of an hourglass cross-sectional shape and an arrowhead cross-sectional shape.

19. The power tool of claim 17, wherein a generally U-shaped first labyrinth path is defined between the seal and the rearward projection of the rear cover, the first labyrinth path configured to inhibit grease or debris migration between the transmission assembly and the motor assembly.

20. The power tool of claim 19, wherein the rearward projection is received in a recess of a fan of the motor assembly with a generally U-shaped second labyrinth path is defined between the rearward projection and the recess, the second labyrinth path configured to inhibit grease or debris migration between the transmission assembly and the motor assembly.

* * * * *